US012615401B2

(12) United States Patent
Fiorentino

(10) Patent No.: US 12,615,401 B2
(45) Date of Patent: *Apr. 28, 2026

(54) PLATFORM, SYSTEM AND METHOD OF GENERATING, DISTRIBUTING, AND INTERACTING WITH LAYERED MEDIA

(71) Applicant: Michael James Fiorentino, New York, NY (US)

(72) Inventor: Michael James Fiorentino, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,042

(22) Filed: Dec. 13, 2024

(65) Prior Publication Data

US 2025/0113071 A1    Apr. 3, 2025

Related U.S. Application Data

(63) Continuation of application No. 18/492,292, filed on Oct. 23, 2023, now Pat. No. 12,206,920, which is a
(Continued)

(51) Int. Cl.
  *H04N 21/236*    (2011.01)
  *H04N 21/845*    (2011.01)

(52) U.S. Cl.
  CPC ......... *H04N 21/236* (2013.01); *H04N 21/845* (2013.01)

(58) Field of Classification Search
  CPC ............. H04N 21/2343; H04N 21/236; H04N 21/2362; H04N 21/2368; H04N 21/434; H04N 21/845
  See application file for complete search history.

(56) References Cited

U.S. PATENT DOCUMENTS

| | | | | | |
|---|---|---|---|---|---|
| 8,611,563 | B2 * | 12/2013 | Davidson | ........... | G06Q 30/0601 |
| | | | | | 381/119 |
| 9,973,827 | B2 * | 5/2018 | Walker | ............... | G06Q 30/0241 |
| 10,403,042 | B2 * | 9/2019 | Roveta | ................ | G11B 27/322 |

(Continued)

FOREIGN PATENT DOCUMENTS

| | | |
|---|---|---|
| WO | 2007031985 A2 | 3/2007 |
| WO | 2016065468 A1 | 5/2016 |

OTHER PUBLICATIONS

International Search Report and Written Opinion dated Aug. 10, 2020 for PCT/IB2020/052586 (8 pages).

*Primary Examiner* — Michael B. Pierorazio
(74) *Attorney, Agent, or Firm* — LUCAS & MERCANTI, LLP

(57)    ABSTRACT

The present application describes platform containing a dynamic multilayered media structure which is generated by aggregation of media pieces into a plurality of media layers. The platform allows users to interact with media layers of the dynamic multilayered media structure independently of one another. The platform further provides for a dynamic, customized media channel lineup and a user account that allows individual media pieces within the dynamic multilayered media structure to play across separate devices that are linked to the account. The user account allows for inputs including real-time controls over the media, interaction, preferences, adding additional media content, editing media into a condensed form, and curation options with the dynamic multilayered media structure.

20 Claims, 12 Drawing Sheets

Related U.S. Application Data continuation of application No. 18/146,013, filed on Dec. 23, 2022, now Pat. No. 11,818,407, which is a continuation of application No. 17/438,423, filed as application No. PCT/IB2020/052586 on Mar. 20, 2020, now Pat. No. 11,570,493.

(60) Provisional application No. 62/821,576, filed on Mar. 21, 2019.

(56) References Cited

U.S. PATENT DOCUMENTS

| | | | | |
|---|---|---|---|---|
| 11,570,493 B2 * | 1/2023 | Fiorentino | .............. | G11B 27/11 |
| 11,818,407 B2 * | 11/2023 | Fiorentino | .............. | G11B 27/11 |
| 2007/0061862 A1 * | 3/2007 | Berger | ................... | H04N 7/163 |
| | | | | 725/62 |
| 2007/0165566 A1 * | 7/2007 | Khan | .................... | H04L 1/0606 |
| | | | | 370/329 |
| 2009/0116668 A1 * | 5/2009 | Davidson | ............... | G11B 27/34 |
| | | | | 386/338 |
| 2010/0172278 A1 * | 7/2010 | Nishio | .................. | H04W 52/42 |
| | | | | 370/312 |
| 2012/0255032 A1 * | 10/2012 | Davidson | ........... | H04N 7/17318 |
| | | | | 726/27 |
| 2014/0101778 A1 * | 4/2014 | Davidson | ........... | H04N 21/2743 |
| | | | | 726/27 |
| 2015/0046808 A1 * | 2/2015 | Dejban | ............... | G06F 3/04847 |
| | | | | 715/716 |
| 2018/0316939 A1 * | 11/2018 | Todd | ................ | H04N 21/21805 |
| 2019/0090025 A1 * | 3/2019 | Chesson | ............. | H04N 21/466 |
| 2020/0226644 A1 * | 7/2020 | Hintz | .................. | H04N 21/812 |
| 2020/0322691 A1 * | 10/2020 | Hui | ........................ | H04L 65/80 |
| 2021/0344991 A1 * | 11/2021 | Todd | ...................... | G06F 3/017 |

* cited by examiner

300

100 AGGREGATION OF MEDIA CONTENT ELEMENTS

110 COMPILING & EDITING MEDIA ELEMENTS

120 CONTENT CURATION PREFERENCES

130 DECISIONING MARKETPLACE

140 DYNAMIC CHANNEL LINEUP TO USER ACCOUNTS

150 DISTRIBUTION TO USER ACCOUNT AND DEVICES

160 REAL-TIME CONTROLS & INTERACTION

170 SHARING OF USER DATA, PREFERENCES & PAYMENTS

MEDIA ELEMENTS COMPILED INTO A DYNAMIC MULTILAYERED MEDIA STRUCTURE

Fig. 5

ORIGINAL VIDEO

CONTENT PRODUCER SELECTS MOST INTERESTING PIECES OF VIDEO SELECTED AS FEATURED VIDEO CLIPS

FEATURED VIDEO CLIPS ARE EDITED TO ALTER SPEED AND OTHER EFFECTS

FEATURED EDITED VIDEO CLIPS ARE COMBINED TO PLAY AS A NEW EDITED VIDEO SEGMENT

EDITED VIDEO SEGMENT IS COMBINED WITH OTHER EDITED VIDEO SEGMENTS TO FORM A VIDEO MIX

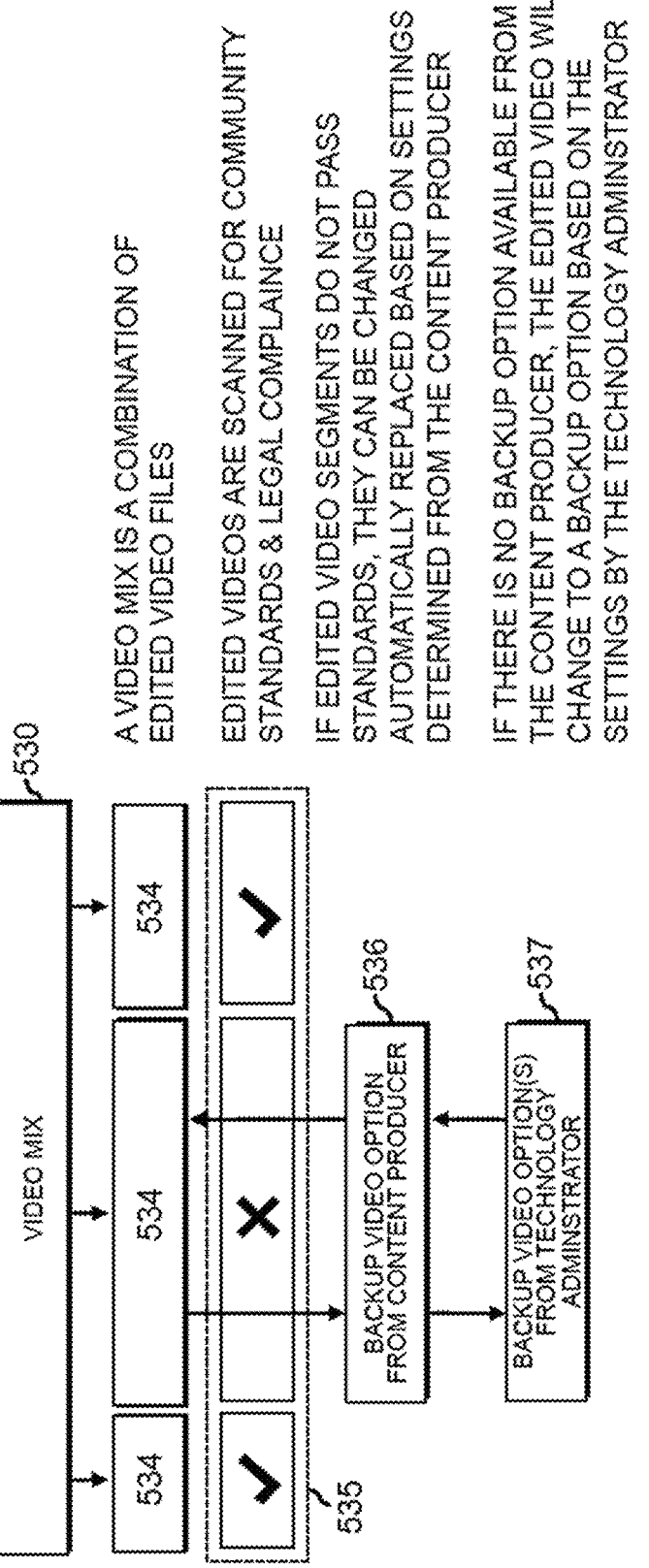

A VIDEO MIX IS A COMBINATION OF EDITED VIDEO FILES

EDITED VIDEOS ARE SCANNED FOR COMMUNITY STANDARDS & LEGAL COMPLAINCE

IF EDITED VIDEO SEGMENTS DO NOT PASS STANDARDS, THEY CAN BE CHANGED AUTOMATICALLY REPLACED BASED ON SETTINGS DETERMINED FROM THE CONTENT PRODUCER

IF THERE IS NO BACKUP OPTION AVAILABLE FROM THE CONTENT PRODUCER, THE EDITED VIDEO WILL CHANGE TO A BACKUP OPTION BASED ON THE SETTINGS BY THE TECHNOLOGY ADMINSTRATOR

Fig. 10

PLATFORM, SYSTEM AND METHOD OF GENERATING, DISTRIBUTING, AND INTERACTING WITH LAYERED MEDIA

CROSS-REFERENCE TO RELATED APPLICATIONS

This application is a continuation of Ser. No. 18/492,292 filed Oct. 23, 2023, which is a continuation of Ser. No. 18/146,013 filed Dec. 23, 2022, now U.S. Pat. No. 11,818, 407, which is a continuation of Ser. No. 17/438,423 filed Sep. 11, 2021, now U.S. Pat. No. 11,570,493, which is a 371 of PCT/IB2020/052586 filed Mar. 20, 2020, which in turn claims the benefit of priority from U.S. Provisional Patent Application Ser. No. 62/821,576 filed Mar. 21, 2019, the contents of each application are incorporated herein by reference.

TECHNICAL FIELD

The present application describes platform containing a dynamic multilayered media structure format which is generated by aggregation of media pieces into a plurality of media layers.

BACKGROUND Art

The present invention relates to entertainment, educational, and human interest related media and, more particularly, to a platform that allows users to interact with and play multiple layers of media across multiple computing devices according to default programmed settings, alternative settings and algorithmically-chosen alternative settings.

Traditional television (TV) displays merged audio and video content. Web-based video content also typically displays merged audio and video content. Web-based video content may allow for more interactivity when compared to content displayed on a TV, but the interactivity of web-based video content is still very limited. Because auditory and visual content on TV or web-based video have been traditionally combined into one media piece, users are unable to change specific components of the video. Additionally, current platforms include closed environments that can only play content on one computing device.

The existing digital media distribution systems serve static media formats that do not change over time. This platform allows for multiple iterations of content, either through editing and condensing content, adding or removing media layers from outside sources, or changing the pre-programmed and customized play settings. The proposed platform also considers the need for continually changing copyright management and payments as they pertain to dynamic multilayered media structures from many sources with original creators, license holders, subscribers, iterative additions and curators. As can be seen, there is a need for a platform that allows users to interact with, play and customize several forms of different media layers from multiple content sources on multiple computing devices.

SUMMARY

The present application describes a computer-implemented system for generating, distributing, and interacting with layered media comprising platform, said a platform comprising at least one dynamic multilayered media structure comprising a plurality of media pieces comprising at least an audio mix layer; at least an audio overlay layer; at least a video mix layer; at least a video overlay layer; at least a data overlay layer; at least a data mix layer; wherein the at least one dynamic multilayered media structure is generated by the aggregation of a plurality of media pieces layered along a timeline into a plurality of layers.

In one embodiment of the system, the platform further comprises a dynamic channel lineup, a decisioning engine, and a decisioning marketplace, wherein said decisioning engine determines the content of the dynamic channel lineup, which is shown to the user, and is based on user content preferences, or brand sponsored content, or financial payment models from brands, or local community standards.

In yet another particular embodiment of the system, the platform further comprises content producers, which are responsible for the curation of the at least one dynamic multilayered media structure.

In yet another particular embodiment of the system, the at least one dynamic multilayered media structure further comprises a plurality of dynamic multilayered media structures which allow for users and content producers to provide iterations with additions of media elements that are recorded into the data profile of the dynamic multilayered media structure and allow for multiple linked variations that derive from the original created dynamic multilayered media structure.

In yet another particular embodiment of the system, the platform further comprises a plurality of channels, wherein each of the plurality of channels comprises a plurality of dynamic multilayered media structures.

In yet another particular embodiment of the system, the platform further comprises brand sponsored content or ad integration which is controlled by the decisioning marketplace being further modified based on the user preferences, settings, and data and processed by the programmatic decisioning engine.

In yet another particular embodiment of the system, the platform further comprises a technology administrator and media serving wherein algorithms, the technology administrator changes or imports external services via API, modifying the decisioning criteria and outcomes, modifying APIs that provide additional features such as blockchain integrations, additional analytics, algorithmic decisioning, third-party certifications or integrations with copyright filtering and other forms of compliance with community standards.

In yet another particular embodiment of the system, the audio overlay comprises at least one audio recording file or audio stream overlaid on at least one of the audio mix layer and the video mix layer.

In yet another particular embodiment of the system, the audio mix layer comprises a plurality of audio files or edited elements of audio files from different services, local or remote playlists of songs or audio files that can play on separate computing devices from the other media layers.

In yet another particular embodiment of the system, the video mix layer comprises a compilation of a plurality of video files which comprise edited video clips and video segments from one or more original video sources or a live streaming video broadcast.

In yet another particular embodiment of the system, the video overlay layer comprises at least one of an image file and a video file overlaid on the video mix layer which include text (subtitles), graphics, motion graphics, scalable vector graphics (SVGs), artistic diagrams, live video stream, a video file or other creative uses.

In yet another particular embodiment of the system, the data overlay layer comprises a link overlaid on at least one of the audio mix layer and the video mix layer, wherein the link provides access to the data mix layer, comprising access to visual or audio scan codes or connection to applications and devices to provide more information about the media content.

In yet another particular embodiment of the system, the data mix layer comprises data on each of the plurality of media pieces comprising aggregation of information about the media layers, providing information across the mobile web pages, applications, web pages, interactive options, meta data, play instructions, brand integration, and the like.

The present application further describes a computer-implemented method for interacting with the platform of the described system, said method being implemented over a computer network and executed by a remote administrator computer, wherein said user accesses the platform through the use of computing devices via user account credentials, and wherein the user interacts with each of the plurality of media pieces layered along said timeline, independently of one another, within the at least one dynamic multilayered media structure via a user interface by adding or removing media pieces from said dynamic multilayered media structure, and said platform comprising methods to decide which content is shown to individual users.

In one embodiment of the method, the users interact with the dynamic multilayered media structures made from the content producers, with sponsored content from brands blended in; and the interactions with the platform may not include Personally Identifiable Information (PII), said user being able to choose to share more or less of their data with the content producers, brands, and the technology administrators through the payment of subscriptions or direct payments for specific pieces of content through the decisioning engine.

In one embodiment of the method, the platform prompts the user to interact with the plurality of channels by watching one of the plurality of channels, changing to another of the plurality of channels, or interacting with the dynamic multilayered media structures within the one of the plurality of channels; and said user connects with several separate computing devices and decide which layers of media are played through each computing device accessing to simple real-time controls.

In one embodiment of the method, the platform provides customized content to large audiences, communities, and individual users, where said users have access to control of their preferences, privacy settings, copyright and compliance filtering and algorithms that decide which content is relevant.

The present application further describes a data processing system, comprising physical means necessary for the execution of the described computer-implemented system and computer-implemented method.

The present application further describes a computer program, comprising programming code or instructions suitable for carrying out the computer-implemented system and the computer-implemented method, in which said computer program is stored, and is executed in a data processing system, remote or in-site, for example a server, performing the respective steps described.

The present application further describes a computer readable physical data storage device, in which the programming code or instructions of the computer program described are stored.

GENERAL DESCRIPTION

Current application describes a computer implemented system that through the use of a platform allows the creation, distribution and interaction with media structures. In contrast to regular media, which has components such as audio and video within the same structure, the described and proposed method of interaction, delivers separate layers of media that are capable of playing in synchronous and asynchronous pairings. Additionally, present invention allows for users to interact with a series of media channels that are programmatically created by either humans, artificial intelligence (algorithms), or a combination thereof.

This platform can be understood as an ecosystem of media structures, which allows the exchange of decisioning mechanisms with external partners, displaying abridged condensed preview elements that link to in-depth versions, additional interactive opportunities, calls to action, online devices or across several computed devices linked to a user account are also considered. Data can be processed based on collectively organized agreements or through individual standards relating to user preferences, observed activities, and regional policies, which also influences the evolution of the proposed platform.

BRIEF DESCRIPTION OF THE DRAWINGS

For better understanding of the present application, figures representing preferred embodiments are herein attached which, however, are not intended to limit the technique disclosed herein.

Figure 4:
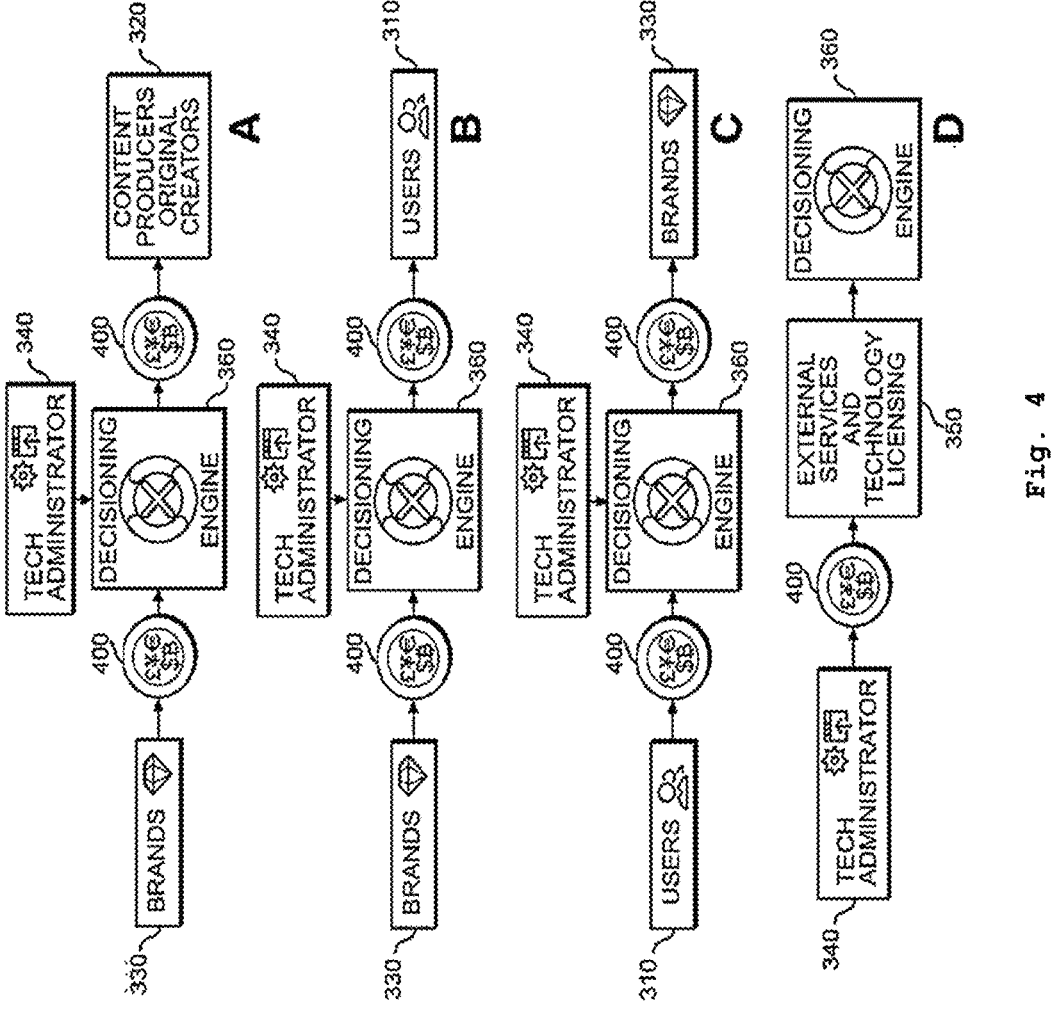

330—brands;

335—brand sponsorship and custom messaging within a multilayered media structure;

340—tech administrator;

345—media serving algorithms and payment processing;

350—external technology services accessed through APIs;

360—programmatic decisioning engine;

FIG. 4—Representation of the platform (300) of media structures resources exchange between:

A—brands and content producers;

B—brands and users;

C—users and brands;

D—tech administrator and external technology services;

The reference numbers relate to:

310—users;

320—content producers;

330—brands;

340—tech administrator;

350—external technology services accessed through APIs;

360—programmatic decisioning engine;

400—currency, token or other resource.

Figure 5:
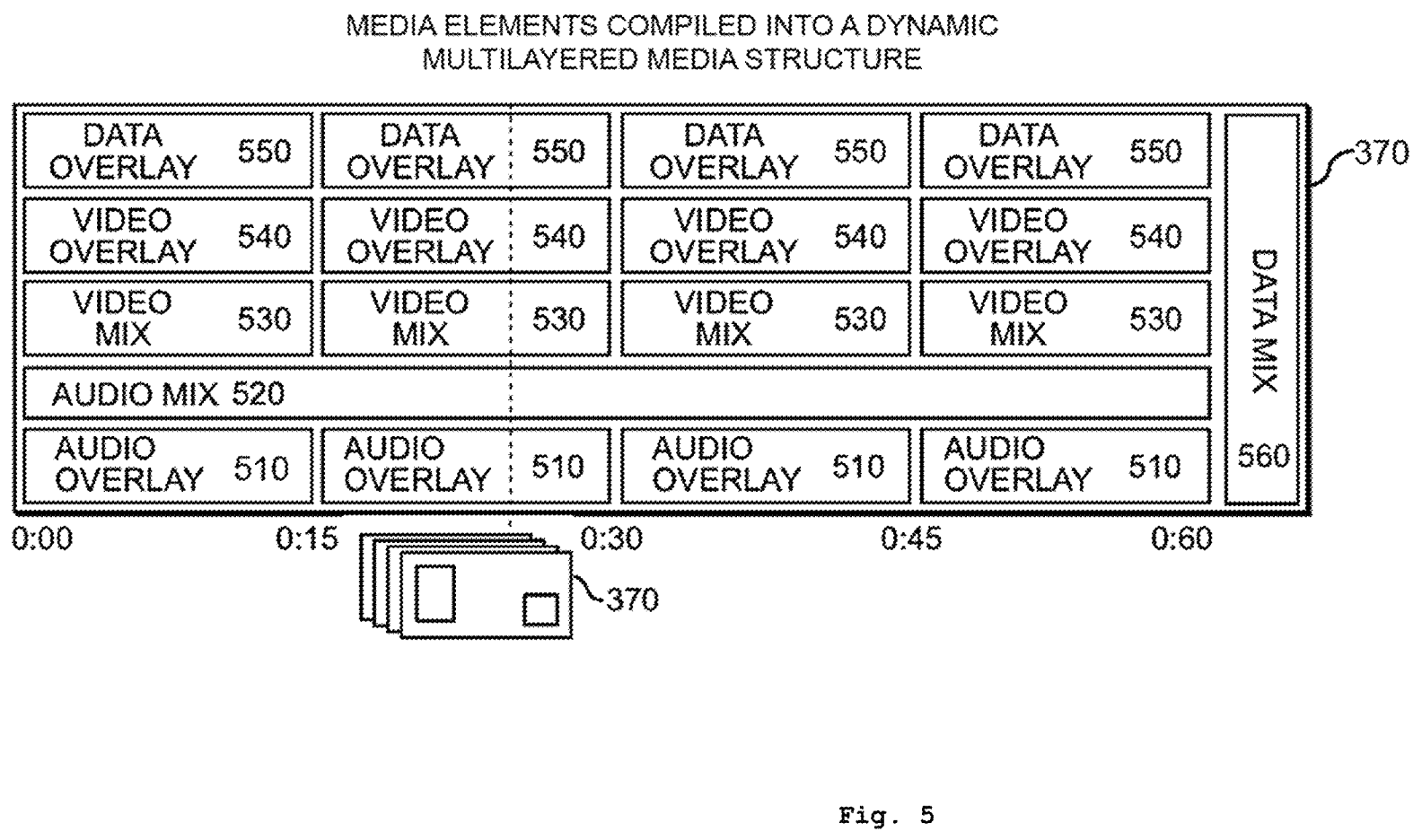

FIG. 5—Representation of the dynamic multilayered media structure (370) where the reference numbers relate to:

510—audio overlay;

520—audio mix;

530—video mix;

540—video overlay;

550—data overlay;

560—data mix.

Figure 6:
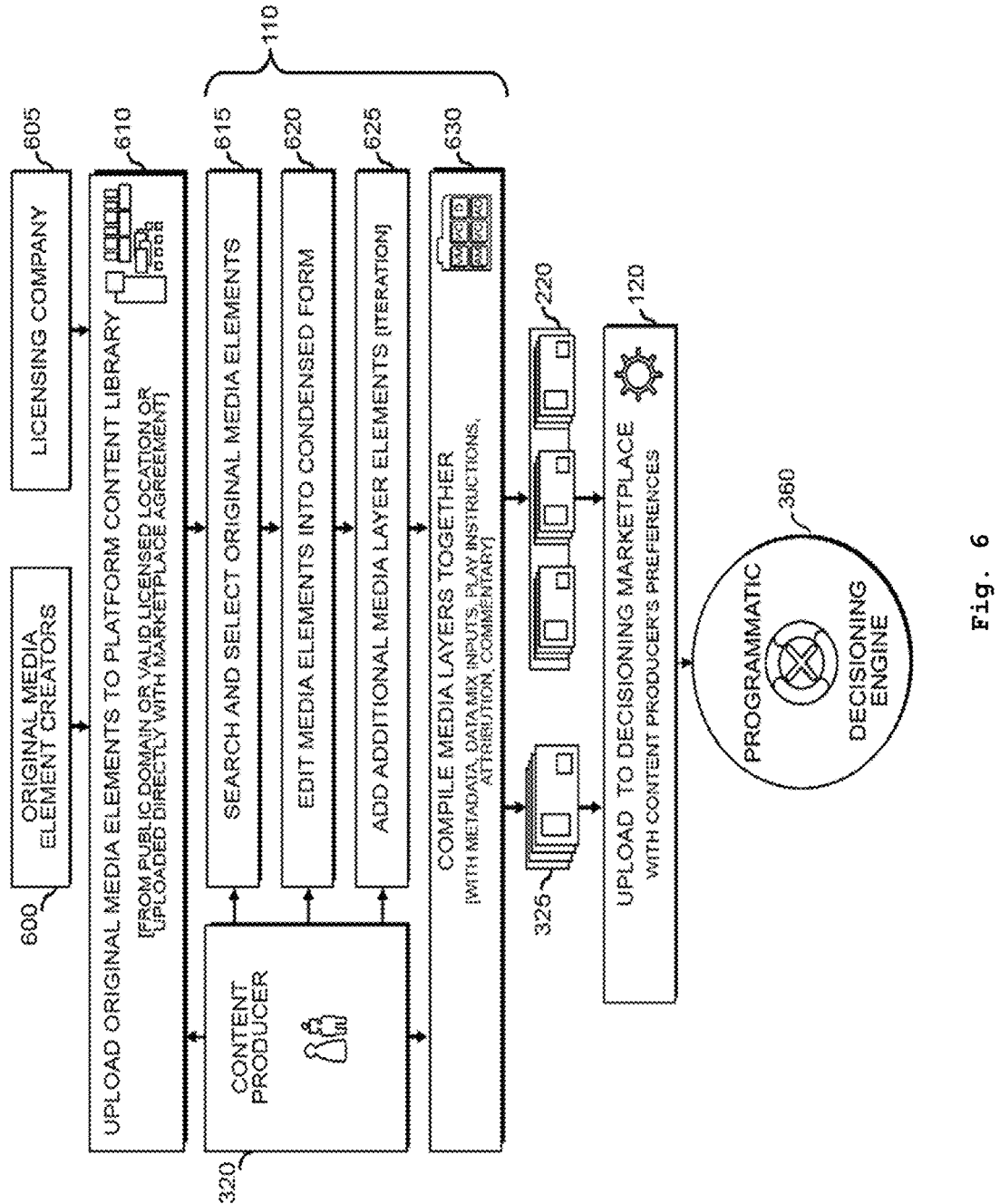

FIG. 6—Representation of the media aggregation (100) and compiling and editing of media elements (110) of the programmed dynamic media elements where the reference numbers relate to:

110—compiling and editing media elements;

120—upload content curation and preferences;

220—specific channel lineup with several dynamic multilayered media structures;

320—content producers;

325—dynamic multilayered media structure created by content producer;

360—programmatic decisioning engine;

600—original media element creators;

605—licensing company;

610—original media elements in platform content library;

615—search and selection of media elements;

620—edit media elements into condensed form;

625—adding additional media layer elements;

630—compile media layers together with data mix inputs.

Figure 7:
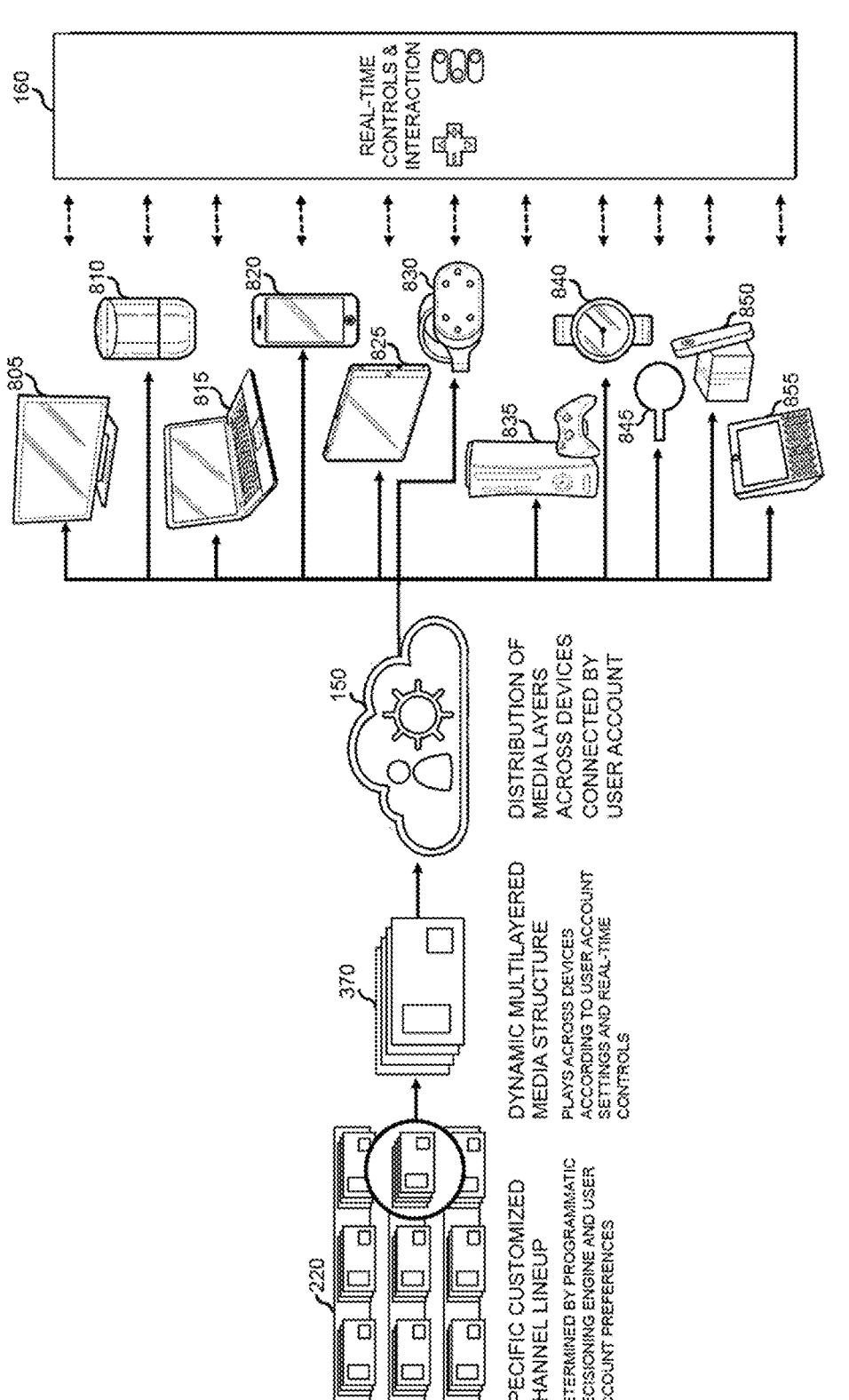

FIG. 7—Representation of the dynamic multilayered media structure (370) playing across several connected devices through a unified account, where the reference numbers relate to:

150—distribution to user account and devices;

160—user real-time controls & interaction;

220—specific channel lineup with several dynamic multilayered media structures;

370—dynamic multilayered media structure created by programmatic decisioning engine;

805—smart TV;

810—IoT speaker;

815—personal computer or laptop;

820—smartphone;

825—tablet;

830—VR headset;

835—multimedia gaming and entertainment console or cable box;

840—smart watch;

845—OTT streaming device;

850—IoT multidevice connector with universal input receiver;

855—smart display device.

Figure 8:
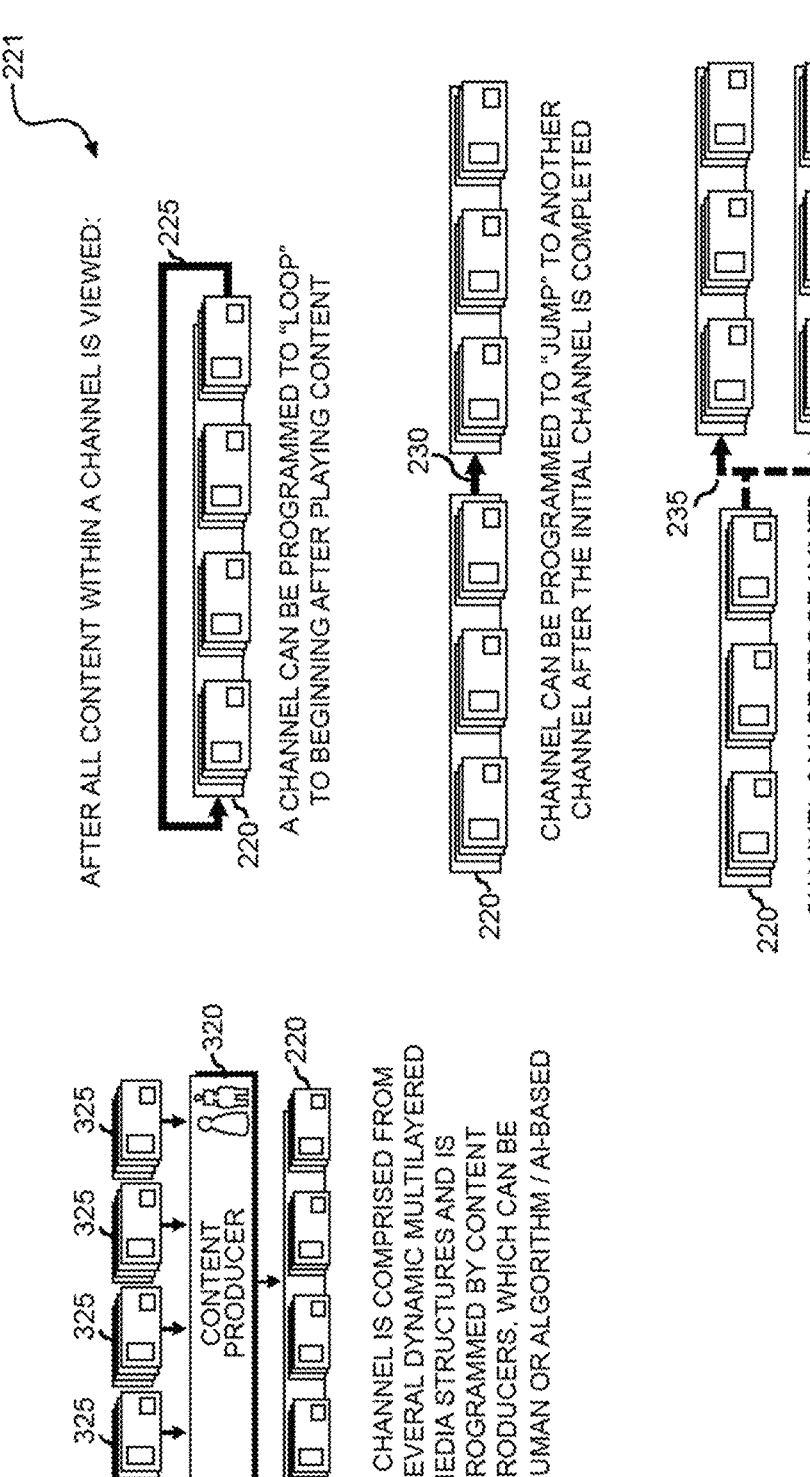

FIG. 8—Representation of programmable options that occur when content within a channel is watched (221), where the reference numbers relate to:

220—specific channel lineup with several dynamic multilayered media structures;

225—loop to beginning of channel content;

230—jump to a different channel;

235—discover a new channel;

320—content producers;

325—dynamic multilayered media structure created by content producer.

Figure 9:
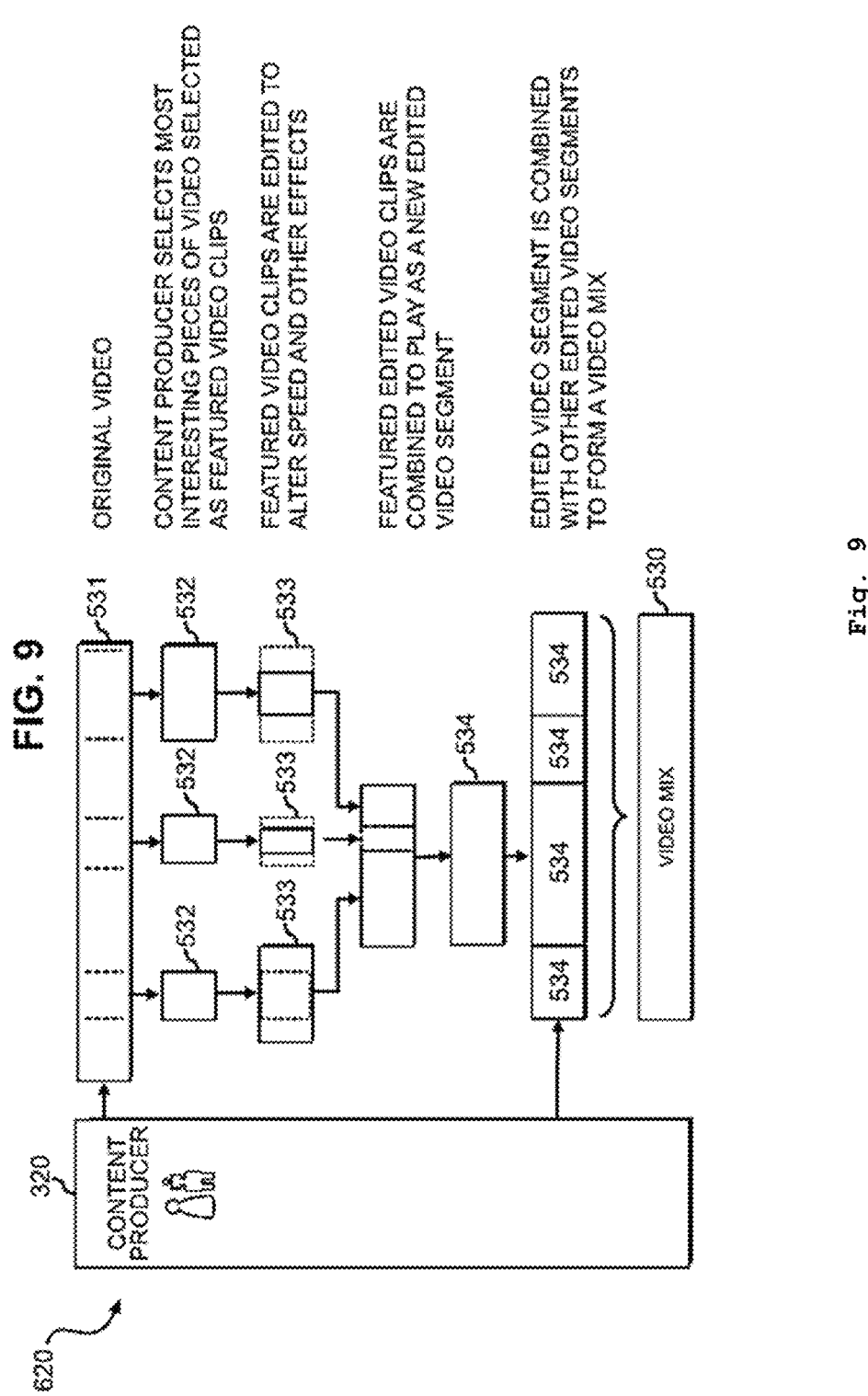

FIG. 9—Representation of the creation of the video mix layer (530) from an original content source to a condensed, abridged version, where the reference numbers relate to:

320—content producers;

530—video mix;

531—original video;

532—featured video clips from original video;

533—edited featured video clips;

534—edited video segment from one original video source.

FIG. 10—representation of the process of scanning, selecting and replacing edited video segments (534) within a video mix (530), where the reference numbers relate to:

530—video mix;

534—edited video segment from one original video source;

535—scanning and filtering for copyright and compliance;

536—backup video segment option default, which can be selected by the content producer;

537—backup video segment option selected by the technology administrator.

Figure 11:
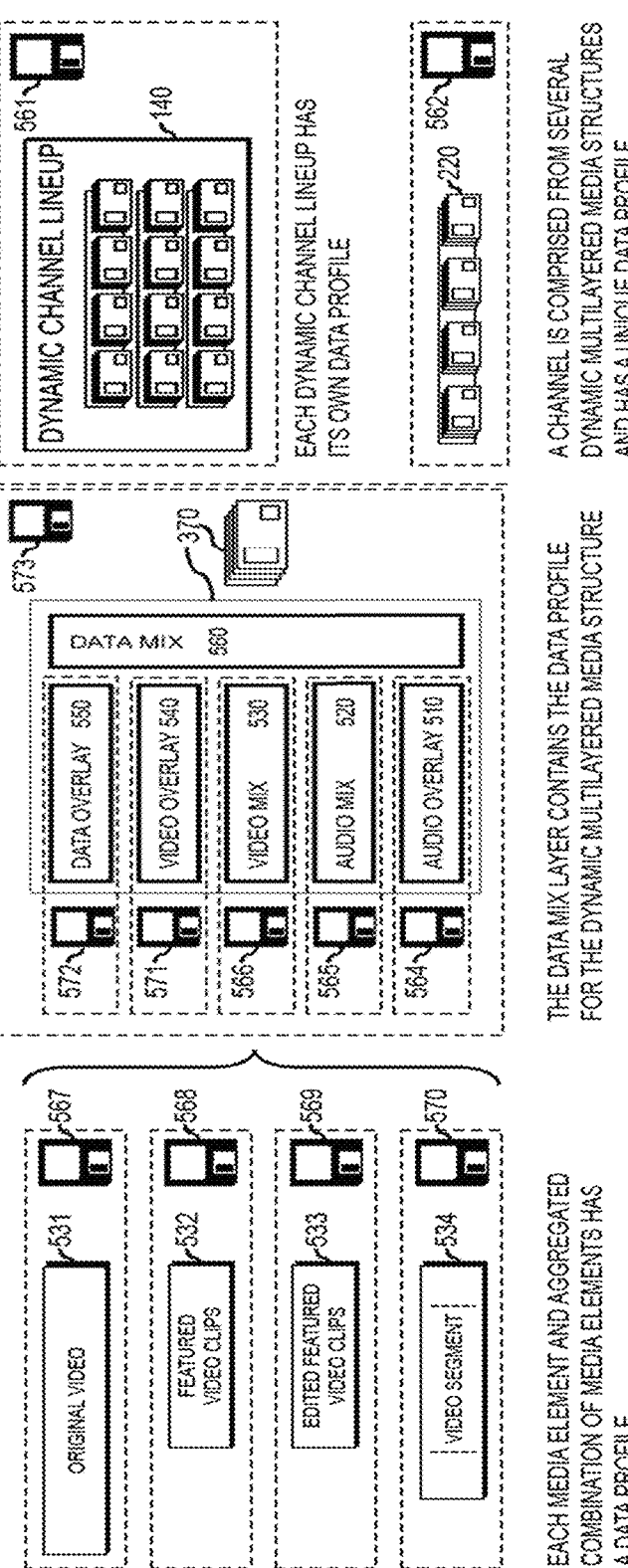

FIG. 11—representation of the data profiles linked to the media layers within the dynamic multilayered media structure (370), where the reference numbers relate to:

140—dynamic channel lineup

220—specific channel lineup with several dynamic multilayered media structures;

370—dynamic multilayered media structure created by programmatic decisioning engine;

321—data form the dynamic channel lineup;

510—audio overlay;

520—audio mix;

530—video mix;

531—original video;

532—featured video clips from original video;

533—edited featured video clips;

534—edited video segment from one original video source;

540—video overlay;

550—data overlay;

560—data mix;

561—data profile for dynamic channel lineup;

562—data profile for channel;

564—data profile for audio overlay;

565—data profile for audio mix;

566—data profile for video mix;

567—data profile for original video;

568—data profile for featured video clip;

569—data profile for edited feature video clip;
570—data profile for video segment;
571—data profile for video overlay;
572—data profile for data overlay;
573—data profile for dynamic multilayered media structure.

Figure 12:
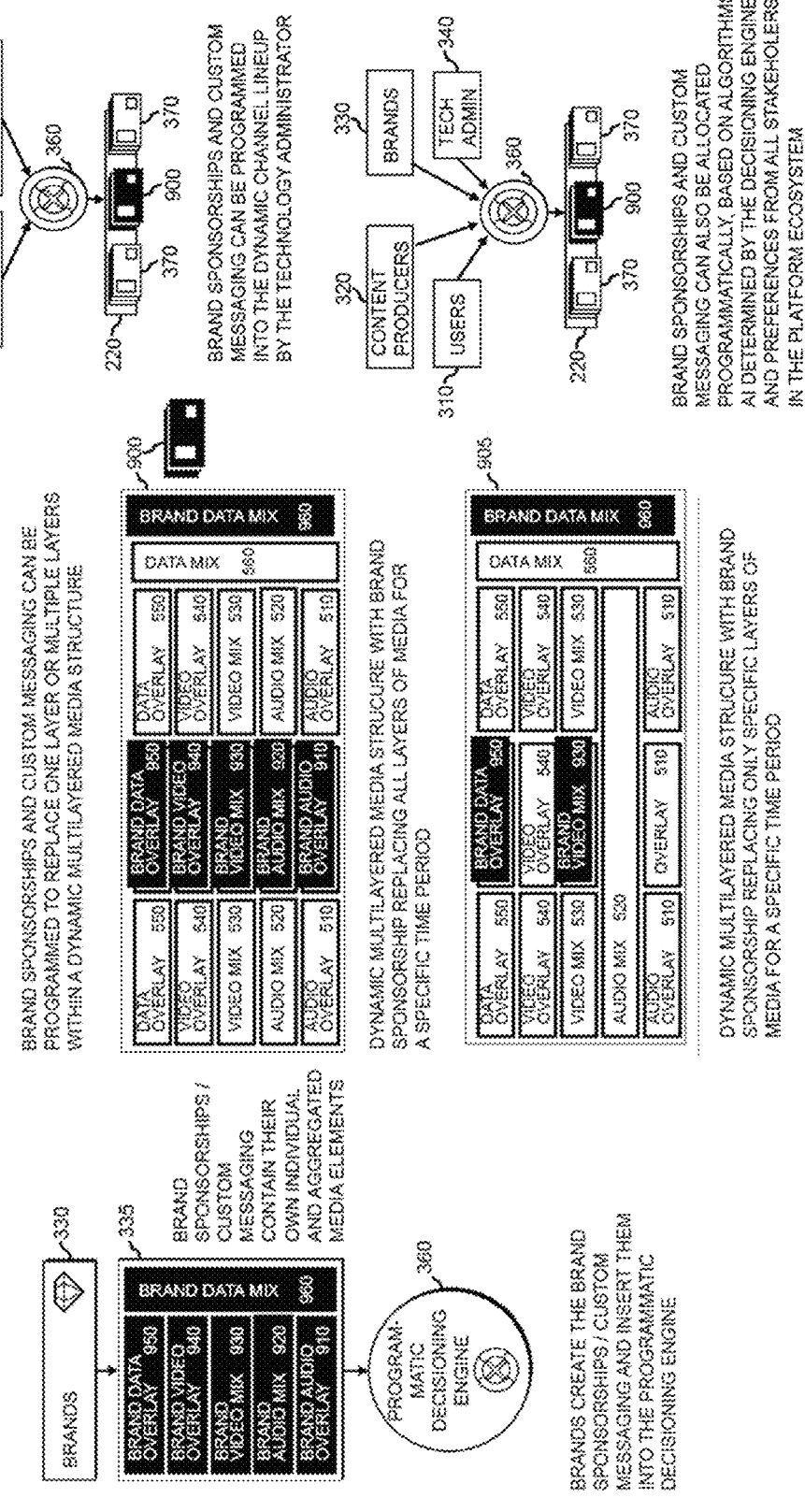

FIG. 12—The insertion of brand sponsorships and custom messaging into channels (220), where the reference numbers relate to:

310—users;
320—content producers;
330—brands;
335—brand sponsorship and custom message within a multilayered media structure;
340—tech administrator;
360—programmatic decisioning engine;
370—dynamic multilayered media structure created by programmatic decisioning engine;
510—audio overlay;
520—audio mix;
530—video mix;
540—video overlay;
550—data overlay;
560—data mix;
900—inserted brand sponsorship or custom messaging over whole dynamic multilayered media structure;
905—inserted brand sponsorship/custom messaging over specific layers within dynamic multilayered media structure;
910—brand audio overlay;
920—brand audio mix;
930—brand video mix;
940—brand video overlay;
950—brand data overlay;
960—brand data mix.

DESCRIPTION OF EMBODIMENTS

With reference to the figures, some embodiments are now described in more detail, which are however not intended to limit the scope of the present application.

Referring to the Figures, the platform (300) of present invention, contains a dynamic multilayered media structure (370) format which is generated by aggregation of a plurality of media pieces (100) which will be exposed to a media compiling (110), being layered along a timeline into a plurality of layers.

This platform (300) further includes a media ecosystem with methods to decide which content is shown to individual users (310). For example, the media compiling (110) is further curated (120) based on user preferences, settings, and data (170). Additionally, the dynamic multilayered media structure (370) may include a brand sponsorship or ad integration, which is controlled by a decisioning marketplace (130) and further modified based on the user preferences, settings, and data (170). The platform (300) further comprises for a dynamic, customized media channel lineup (140) and a cloud-based user account that allows individual media and pieces within the dynamic multilayered media structure to play across separate devices (150) that are linked to the account.

Users (310) may have real-time user controls, interaction, preferences, and curation options (160) with the dynamic multilayered media structures.

The platform (300) also allows for new opportunities of creation, expression and interactivity while providing customized content to large audiences, communities, and individual users (310), also providing the user with control of privacy settings, copyright filtering, allowing for interchangeable algorithms that decide which content is relevant for the user (310).

A user (310) views and interacts with this platform (300) through the use of computing devices (200) each having at least a processor, a memory, a user i interface, and a communications interface. The platform (300) may be supported by a server. The computing devices retrieve data from the server over a network, via wireless streaming or by downloading files locally, to the computing devices (200) via the communications interface.

The computing devices (200) may be remote from the server and may include, but not limited to, a desktop, a laptop, Virtual Reality (VR) headset (830), Augmented Reality (AR) devices, a smart device, such as a tablet (825), a smartphone (820), a smart speaker (810), and a smart television (805), or a television connected to at least one of: a cable network; a fiber optic network; a satellite network; or a digital media player capable of connecting to the Internet. The user interface might include hardware, software, or both providing one or more interfaces for communication between the computing devices and the server. As an example and not by way of limitation, a user interface may include a keyboard, keypad, microphone, monitor, mouse, printer, scanner, speaker, still camera, game controller, remote control, stylus, touchscreen, trackball, video camera, another suitable device or a combination of two or more of these.

In certain embodiments, the computing devices and the server may execute on any suitable operating system such as IBM's zSeries/Operating System (z/OS), MS-DOS, PC-DOS, MAC-OS, WINDOWS, UNIX, OpenVMS, operating systems based on LINUX, mobile operating systems such as iOS, android mobile, android TV, or any other appropriate operating system, including future operating systems. In certain embodiments, the server may be a web server running web server applications such as Apache, Microsoft's Internet Information Server™, and the like. The web server may be part of a cloud-based network.

In particular embodiments, the computing devices and the server include a processor, a memory, and a communications interface. In particular embodiments, the processor includes hardware for executing instructions, such as those making up a computer program. The memory is for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to the computing device, where appropriate. In particular embodiments, the memory is non-volatile, solid-state memory. The database of the server includes mass storage for data. As an example and not by way of limitation, the database may include an HDD, a floppy disk drive, flash memory, an optical disc, a magneto-optical disc, magnetic tape, a Universal Serial Bus (USB) drive, a solid-state drive (SSD), or a combination of two or more of these. The database may include removable or non-removable (or fixed) media, where appropriate. The database may be internal or external to server, where appropriate. In particular embodiments, the database is non-volatile, solid-state memory.

The communication interfaces include hardware, software, or both providing one or more interfaces for communication (e.g., packet-based communication) between the server and one or more other computing devices or one or more networks. As an example and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the server and computing devices may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the server and computing devices may communicate with a wireless PAN (WPAN) (e.g., a BLUETOOTH WPAN), a WI-FI network, a WI-MAX network, a cellular telephone network (e.g., a Global System for Mobile Communications (GSM) network, 5G, 6G), or other suitable wireless network or a combination of two or more of these. The server and computing devices may include any suitable communication interface for any of these networks, where appropriate.

When the platform (300) is accessed by the computing devices (200), the user is presented with a default channel (210) which plays default dynamic multilayered media structures (370) at first, showing video content on a screen and the audio playing through speakers from either the same computing device or a separate computing device, depending on the user settings. The user is provided options to change the content on the screen by changing the channel (215), which loads an entirely different series of dynamic multilayered media structures. The user then may watch the channel (218). Once the user has watched all the content within a channel (221), the platform (300) may respond according to its pre-programmed settings. For example, the pre-programmed settings may initiate the channel (220) to loop (225), i.e. go back to the first dynamic multilayered media structure within the channel (220) and replay, jump to a different channel (230) that has been programmed in advance by the content producer (320) or the user (310), or discover a new channel (225) based on Artificial Intelligence (AI) algorithms and user preferences.

While viewing a dynamic multilayered media structure (370), a user can use their computing devices (200) to interact with the media layers (240). The user may "swap" specific media layers (242), moving from the default settings (i.e. default audio mix playlist, default settings for overlays) to other alternate options. These alternative media layers are pre-programmed into the dynamic multilayered media structure (370) and usually include an option to disable (turn off) a specific media layer or change the visible layer to an alternative media layer that has already been pre-programmed into the dynamic multilayered media structure (370). The user may also access a data mix layer (560), either through a data overlay layer (550) or directly through an application, which is typically displayed on a separate device from the screen that plays the video mix (530) content. The data mix layer (560) contains data profiles for all of the media layers, play instructions, and allows the user to learn more about the media presented in order to take actions related and over the media, the channel, or brand sponsors. In certain embodiments, the user can also directly access a specific dynamic multilayered media structure (370), original media element, or channel (220) by accessing the platform content library (246), which can be searched or browsed through categories in a more traditional web/video-on-demand format.

Figure 1:
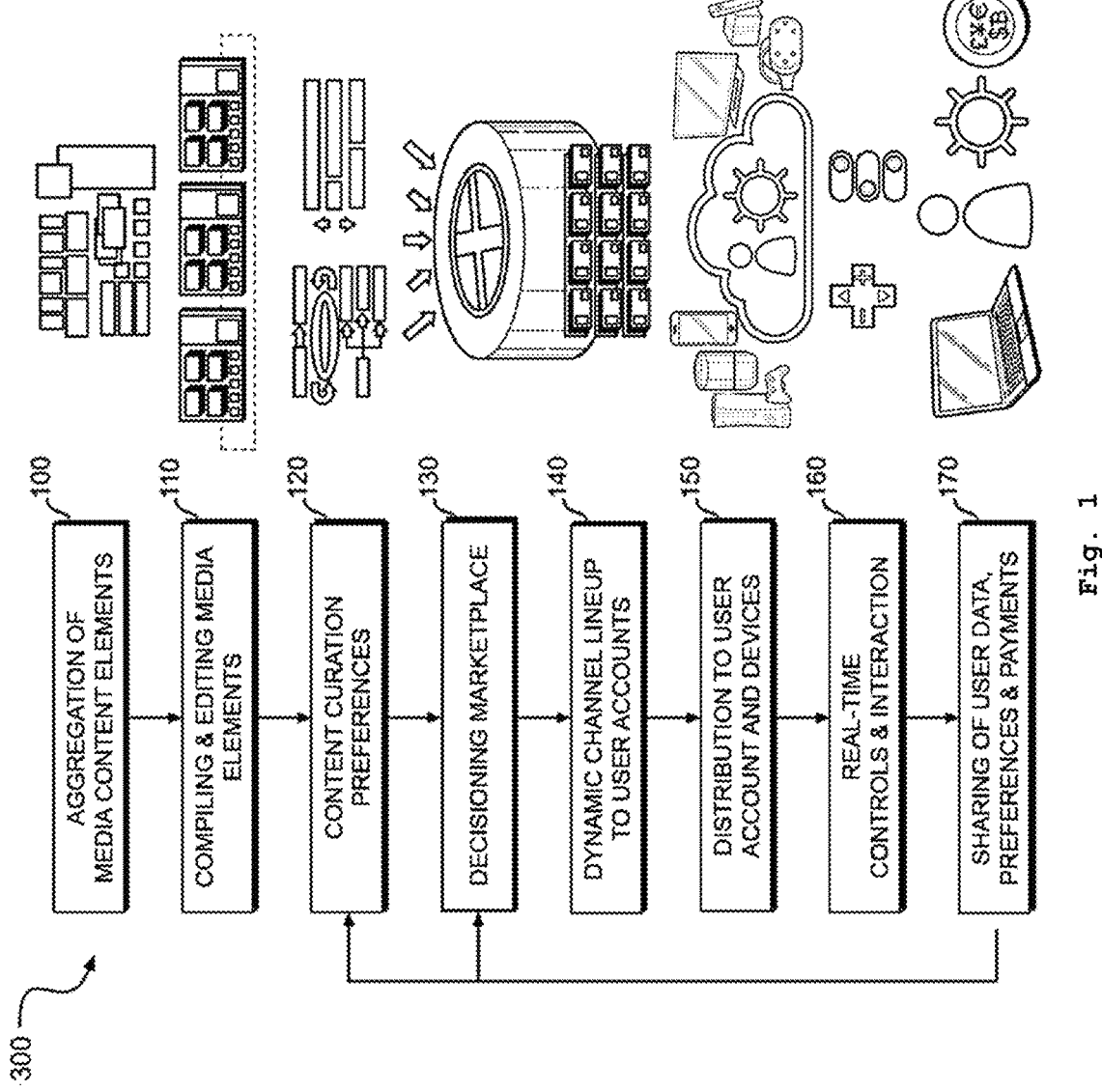
FIG. 1—Represents the overview of the platform (300) where the reference numbers relate to:
- 100—aggregation of media content elements;
- 110—compiling and editing media elements;
- 120—upload content curation and preferences;
- 130—decisioning marketplace;
- 140—dynamic channel lineup;
- 150—distribution to user account and devices;
- 160—user real-time controls & interaction;
- 170—sharing of user data, preferences, and payments.
Figure 2:
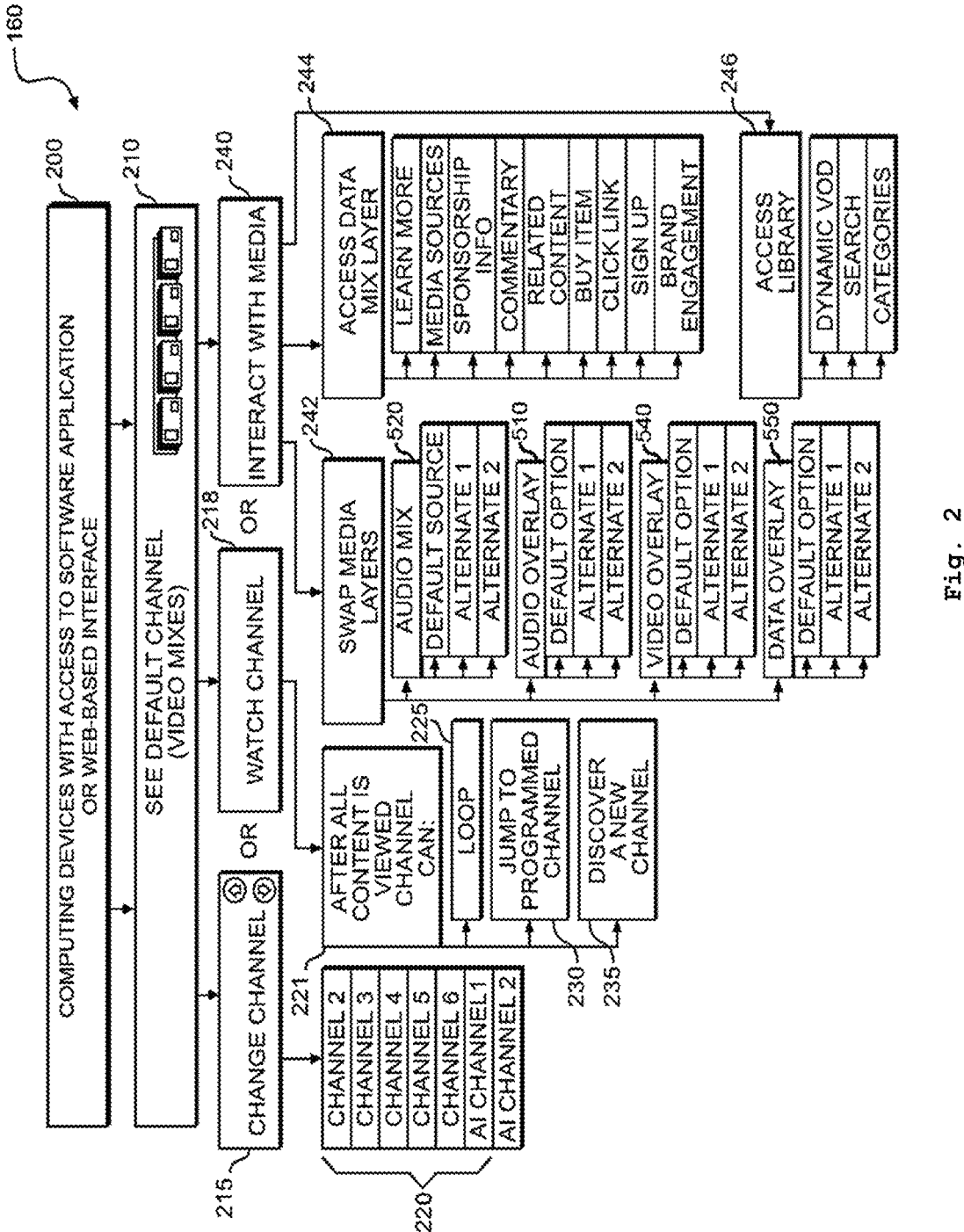
FIG. 2—Represents the overall user real-time controls & interaction (160) with the platform where the reference numbers relate to:
- 200—computing devices with access to software application or web-based interface;
- 210—default channel;
- 215—controls to change channel;
- 218—watch channel;
- 220—specific channel lineup with several dynamic multilayered media structures;
- 221—programmable options that occur when content within a channel is watched;
- 225—loop to beginning of channel content;
- 230—jump to a different channel;
- 235—discover a new channel;
- 240—controls to interact with the media layers;
- 242—swap media layers;
- 244—access data mix layer;
- 246—accessing library of channels, multilayered media structures and media elements.
Figure 3:
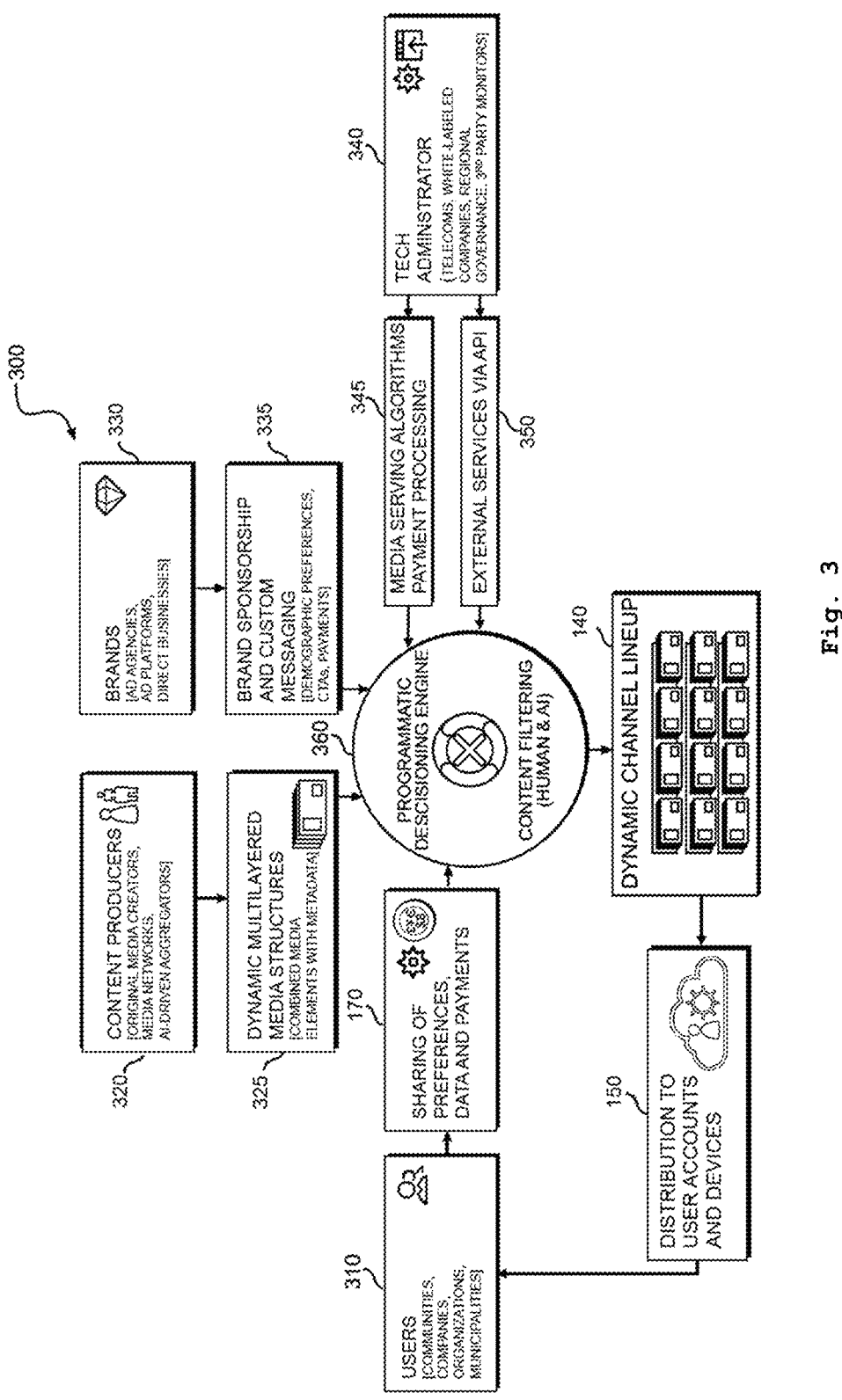
FIG. 3—Representation of the platform (300) of media structures and decisioning marketplace where the reference numbers relate to:
- 140—dynamic channel lineup;
- 150—distribution to user account and devices;
- 170—sharing of user data, preferences, and payments;
- 310—users;
- 320—content producers;
- 325—dynamic multilayered media structure created by content producer.

Referring to FIG. 3, the proposed platform (300) may create a dynamic channel lineup (140) of content for each user (310). This may be determined through a media marketplace that connects the media content and preferences between the key stakeholders, which include the users (310), content producers (320), brands (330) and the technology administrators (340).

On a basic level, the users (310) view dynamic multilayered media structures (370) made from the content producers (320), with sponsored content (335) from brands (330) blended in. The user (310) may also adjust their content preferences (170), choosing what types of media, shows or content categories they would like to see, which is considered during the programmatic decisioning phase (360). The user (310) has the option of accessing content for free if the content is sponsored entirely by brands (330), or pay for a subscription in order to have access to exclusive content and/or have more control over the content and the number of brand sponsored content (335) that they see. The cost structure and subscription plans, in addition to the payment percentages that go to the content producers (320), original media element creators (600), and licensing companies (605) are determined by the technology administrator (340).

The programmatic decisioning engine (360) determines the weight and impact of specific factors to generate the user (310) viewed dynamic channel lineup (140), including but not limited to: user content preferences (170); brand sponsored content (335); financial payment models from brands (330) and users (310); and local community standards.

The technology administrator (340) has access to change and/or import media serving algorithms (345) that modify the decisioning criteria and outcomes. The technology administrator (340) can also add external services via APIs (350) that provide additional features such as blockchain integrations, additional analytics, or integrations with copyright filtering that complies with regional standards.

Referring to FIG. 4, from A through D, the key stakeholders, namely the users (310), content producers (320), brands (330), and the technology administrators (340), interact with the platform (300) by sharing their content, data, or a currency exchange through the decisioning engine (360). The platform (300) can be configured to process and exchange resources (400) such as fiat currencies, blockchain payments, media tokens or alternative systems of payment. The user's (310) interactions may be anonymized and thereby may not include Personally Identifiable Information (PII). The user (310) may choose to share more or less of their data and preferences (170) with the content producers (320), brands (330), and the technology administrators (340). Users (310) can pay subscriptions or direct payments for specific pieces of content through the decisioning engine (360). Part or all of the payment can go to the content producers (320), which may be determined by the tech administrator (340). The tech administrator (340) can choose to keep a service fee, as a flat charge or a percentage, based on their contract, or they can pass the payment directly to the content producer (320).

In certain embodiments, the decisioning engine (360) can also pass portions of the payments directly to the original media element creators (600) and pay the content producers (320) less if the content producers (320) used external, non-original media content to produce the dynamic multilayered media structures (370). In addition, brands (330) may pay into the programmatic decisioning engine (360) in order to sponsor content or to place sponsored ad content or custom messages (335) within the platform (300). There is also potential for other business models, such as the user (310) being compensated by receiving access to content for free or paid by the brands (330).

The tech administrator (340) determines the rules, algorithms used, external partners, and general criteria that determine the content that the user (310) can see and the form of compensation that is delivered to the user (310). The pricing of the brand sponsorship ad placements (335) is determined by the decisioning engine (360) and typically includes factors such as the cost and quality of the media and how specific the user demographic requests are in relation to other brands (330) who want to show their ads to the same users (310). The tech administrator (340) can connect to advertising decisioning technologies via Application Programming Interface (API) integrations (350) or other methods in order to determine the price structure and media serving criteria.

Users (310) can purchase content from brands (330) directly through the platform (300). The currency exchange goes through the decisioning engine (360), directly to the brand (330), or through an approved financial service that partners with the technology administrator (340). The technology administrators (340) can provide their own technology or they can license external technology (350) to help in areas such as decisioning, blockchain services, copyright filters (535) and analytics.

Referring to FIG. 5, the proposed platform (300) of the present invention delivers dynamic multilayered media structures (370) to users (310). Each of the dynamic multilayered media structures (370) include several individual pieces that are paired together to be viewed, experienced and interacted with.

For example, the dynamic multilayered media structures (370) comprise a plurality of media pieces (100) layered along a timeline into a plurality of layers that, may include an audio mix layer (520), an audio overlay layer (510), a video mix layer (530), a video overlay layer (540), a data overlay layer (550), and a data mix layer (560).

The audio mix layer (520) may include streaming playlists and audio files from different services or local playlists of songs or audio files.

The audio overlay layer (510) may include audio recording files, such as podcasts or streaming audio content.

The video mix layer (530) may include streaming video from one source or a plurality of sources or it can include one video or a compilation of several video segments (534), which are comprised of one or multiple edited video clips (533). These featured video clips (532) come from original videos (531) and are edited and curated by the content producer (320).

The video overlay layer (540) may include motion graphics, scalable vector graphics (SVGs), animated graphics, text, live video stream, or a video file that plays over video.

The data overlay layer (550) may include access to visual or audio scan codes or connection to applications and devices to provide more information about the media content.

The data mix layer (560) may include aggregation of information about the media layers and may provide information across the mobile web pages, applications, web pages, interactive options, meta data, play instructions, brand integration, and the like.

The file formats can be streamed from external sources via API integrations, content stored on the media platform's server, or locally saved files.

All of these media layers within the dynamic multilayered media structure can be programmed to have default play options and multiple alternate options from external streaming sources and local media content. The user (310) has the option to swap (242) between these default and alternate media sources.

The dynamic multilayered media structure (370) plays two or more separate layers of the media described above at a specific time that is linked between the separate layers. These settings are embedded into the data mix layer (560) of the dynamic multilayered media structure (370).

The dynamic multilayered media structure (370) format of the present invention allows for some media file types (i.e. video files) to view a modified version (533) of the original media file (531), but indicates the media content "piece" that it came from, allowing for a user to access a "micro" (modified, distilled) version (534), or the "macro" (original, unedited) file (531). This also allows for a series of files paired together to be played as a stream (i.e. audio playlists). Additional pieces of media content can be added to the dynamic multilayered media structure (370) by the user (310), original creator (600), by a content producer (320), by algorithmic decisioning, or by AI.

Video overlay (540) and audio overlay (510) layers can be linked to video mix (530) or audio mix (520) layers based on time stamps, which ensures that iterative creative content can be added or changed. This is called "media chrono-synching."

When the media layers are combined together, the dynamic multilayered media structure (370) plays as asynchronous layers and command instructions can determine how the layers play together.

Referring to FIG. 6, the content producer (320) can edit media elements into a condensed form (620), where the original material for a dynamic multilayered media structure (370) can be aggregated from original media creators (600) and licensing companies (605) including publishing companies. Original media creators (600) can upload their content to the platform content library (246) and can set terms for sharing and compensation (610). Content producers (320) can be human or AI and can either find/search the content from valid sources online (such as the creative commons) or they can access content stored in the platform content library (246). Content producers (320) locate media files for a specific purpose, i.e., education, interactivity, mood enhancement, and edit the media (620) and aggregate multiple layers of supporting media (625) in order to allow the users (310) to efficiently discover or benefit from the media content. Content producers (320) and users (310) can add iterations of media elements (625) to the dynamic multilayered media structure (370), which can create alternative versions of the dynamic multilayered media structure (370). These variations, forks and branches can be recorded in the data profile (573) of the dynamic multilayered media structure (370) with the inclusion of version history information.

Adding information about the media source (630) (attribution, links to original content) can be done automatically through the use of AI or manually. Content producers (320) can add all layers from the original media content sources (610) or they can create their own layers and add them to the dynamic multilayered media structure (370); i.e., video overlay (540), audio overlay (510), commentary in the data mix layer (560). The requirements for adding attribution information may vary depending on the technology administrator's (340) decisions. Additional layers of video, audio, and contributions to the data mix layer (560) can be added as commentary or creative expression.

The media layers are compiled together with metadata, data mix inputs, attribution and commentary (630) to generate the dynamic multilayered media structures (370) and channels (220). These media layers are edited together to have a smoother transition and become more interesting by editing speed, cropping, pairing, visual filters, audio filters, or similar editing controls. Users (310) may act as content producers (320) and curate dynamic multilayered media structures based on a theme, an interactive intention, or a general mood/tone. Content producers (320) consider the feelings, observed pairings, and creative expression. AI programs can use machine learning to observe how successful human and other AI content producers are at creating dynamic multilayer media structures. When a content producer compiles a dynamic multilayered media structure (325) and uploads it to the decisioning marketplace (120), the dynamic multilayered media structure can be changed based on payment settings, user preferences (170), and policies established by the tech administrator (340). After these considerations, a modified dynamic multilayered media file is generated (370).

The AI analyses the metadata to learn how to create new dynamic multilayered media structures (370). Users (310) can collaborate with AI programs to set parameters and preferences for media creation, allowing the scaling of the media production. The created dynamic multilayer media structures are then added to the platform content library (246) with the content producer's preferences. Additional media (i.e. video overlay, audio overlay, commentary in the data mix layer) content can be created and linked to any of the dynamic multilayered media structure (370), allowing the files to dynamically evolve.

Referring to FIG. 7, the dynamic multilayered media structures (370) may be accessed and played across several/multiple connected computing devices through a unified account (150). As previously mentioned, the platform (300) supports a plurality of channels (220) where each channel (220) includes a plurality of dynamic multilayered media structures (370). The computing devices can be smart TVs (805), smart speakers (810), laptop or desktop computers (815) accessing web pages or software applications, smart phones (820), tablets (825), VR headsets (830), multimedia gaming and entertainment console or cable box (835), wearable internet-of-things (IoT) devices (840) such as smart watches, streaming over-the-top (OTT) device (845), IoT connected universal device controllers (850), smart display device (855) and any other devices that can play the software applications and connect to external controls.

The user (310) can connect several computing devices to their account and decide which layers of media are played through each computing device. This allows the user (310) to have easier access to simple real-time controls (160) and advanced controls (170), while optimizing their media experience.

The following are examples of how each computing device may be used to interact with the platform (300): Real-time controls (160), advanced settings (170), and access to the data layer (244) are done via mobile phone (820), either through the mobile app or web browser that is linked to the user account. Advanced controls and access to the data layer can be connected to the tablet (825) touchscreen. Audio layers and real-time voice commands can play through an IoT speaker (810). The user may access real-time controls via a smart watch (840). Advanced controls and data layers can be accessed through smart TV (805). Real-time controls, advanced controls and access to the data layers can be executed via online account/web on a laptop (815). Basic information from the data layer can be presented as a semi-transparent overlay that the user (310) can see while using the VR headset (830). Real-time controls can be executed with a connected remote control or through gestures that are compatible with the VR headset (830). Advanced controls may be accessed on separate devices such as PC or mobile app while the user is away from the VR headset (830).

Referring back to the Figures, the platform (300) plays a synchronized combination of dynamic multilayered media structures (370) that include of video, audio, and data that can operate across multiple devices that are unified to a single account.

Users (310) can swap or toggle (turn off/on or combine) media layers (240), which modifies each layer of media for other options, including pre-programmed content and content added by the users (310). This creates a unique viewing experience based on the user's controls. Users (310) can act as content producers (320) and compile multiple media elements (video, audio, data layers (630) to create and publish their own multilayered media structures (325) or curate existing dynamic multilayered media structures (370) to create one of their own. Dynamic multilayered media structures (370) are also synced with data that includes user account preferences, advertising settings, and content information. The users (310) can access the data mix layer (560) which corresponds to each layer of multilayered media structure content. The data mix layer (560) settings are visible in the platform (300) and can also be viewed on a corresponding web page that is automatically compiled based on this information.

The video mix layer (530) can play either full-length videos, live streams of videos, or compilations of videos derived from many separate sources. The video mix (530) is a layer of a dynamic multilayered media structure (370) that fills a specific amount of time (i.e. 15 minutes) and can either be pre-edited into one large file, it can be a broadcasted livestream, or it can exist as several smaller pieces.

Referring to FIG. 9, a content producer (320) can edit media elements into a condensed form (620), which can apply to all media layers within the dynamic multilayered media structure (370). A content producer (320) can create a video mix (530) by taking a full-length original video (531) and selecting featured video clips (532). These featured video clips can become edited by changing the speed, adding visual filters and other effects (533). These featured edited video clips come from one original video source (531) and are combined with other featured edited video clips from the same source to be compiled into a video segment (534). A video mix can consist of one or several video segments (534).

As an example, an original video media element (531) may be 4 minutes in length. After selecting the 3 most interesting video clips (532) from the original video (531), each clip could be 30 seconds in length, totaling 90 seconds. After changing the speed of these video clips (532), the 3 edited featured video clips (533) could be 15 seconds each, totaling 45 seconds when they are combined into a video segment (534). Several video segments can be combined together to make a video mix (530). In this example, there could be 20 video segments (534) that are combined to make a total of 15 minutes.

Final video mixes can play the sound from the original video source (531) or the video mix can be made silent. Sound can be re-added later as an audio overlay layer (510).

The video overlay layer (540) is played with a video mix layer (530) and provides additional context or expression. This can be in the form of text (subtitles), graphics, artistic diagrams or other creative uses. The video overlay layer (540) can also be programmed to play along with other layers within a dynamic multilayered media structure (370) (i.e. a video with a Yoga teacher in the video overlay layer (540) that is linked to an audio overlay layer (510) that has interchangeable audio mix (520) and video mix layers (530). The video overlay layer (540) responds to the dynamic multilayered media structure's default and alternative (customized) settings. The video overlay layer (540) can be turned off by default and the user can press a control to activate the video overlay layer (540). Alternatively, the video overlay layer (540) can be playing by default in some cases, such as educational content.

The audio mix layer (520) provides several options to stream playlists, set lists, or several audio files. The audio mix layer (520) enhances the video mix viewing experience and enhances the general mood of the dynamic multilayered media structure (370). The audio mix layer (520) can be played on a separate computing device from the other media layers. For example, a connected/smart TV (805) can play the video mix layers (530) while the audio mix layer (520) plays on a Smart/IoT/Connected speaker device (810).

The audio mix layer (520) can be programmed to play an external streaming audio service via API integrations that are linked to the user's account. The dynamic multilayered media structure (370) allows the user (310) to select other songs from the same audio mix source (playlist) or they can "swap" the audio mix layer (520) and play a different audio mix source, such as: a different playlist within the same audio streaming service; a set list of music from a different audio streaming service; and a playlist consisting of local music files located in a specific file path on a media playing device that is connected to the user's account. Audio mix layers (520) are designed to make a channel (220) of dynamic multilayered media structure (370) have a flow that allows for the other layers to play together seamlessly. Each series of audio mix layers (520) may be paired with a corresponding video mix layer (530).

Alternatively, the audio mix layers (520) can be linked to other media layers such as the audio overlay layer (510) within the dynamic multilayered media structure (370). As mentioned above, each individual dynamic multilayered media structure (370) may be programmed to have a specific audio mix layer (520) that plays with the video mix layer (530) and other layers. The properties and play instructions of an audio mix layer (520) can be programmed to play differently when several dynamic multilayered media structure (370) are combined to play together in a multilayered media channel (220). Audio mix layers can be programmed by the content producers (320) to: continue playing a specific audio mix layer (520) while the layers from other dynamic multilayered media structures (370) play; jump to the audio mix layer (520) that corresponds with the current dynamic multilayered media structures (370) after a playlist has ended; configure an audio mix layer (520) so that the song playing continues while the other layers of the dynamic multilayered media structures (370) play, but switch to the new audio mix layer (520) that is programmed along with the other dynamic multilayered media structures (370) at a specific moment, i.e. switch audio mix layer (520) when the next song ends, and allow the selection of a different audio mix layer (520) option according to predicted settings from artificial intelligence, machine learning, or as determined by algorithms. The audio overlay layer (510) may be made to play with a specific video mix layer (530), audio mix layer (520), over video overlay layer (540).

The audio overlay layer (510) can be used to recreate traditional audio commentary, to add audio to a separate video mix layer (530), or to play content while using background music as a separate layer. For example, pairing an audio overlay layer (510) with a video mix layer (530) can be used to re-create the traditional TV/Movie watching experience. The audio overlay layer (510) can be turned on and off and can be changed to alternate options. When an audio overlay layer (510) is enabled, the audio mix layer (520) can be programmed to adjust the volume so that the user (310) can hear the audio overlay layer (510) clearly.

The data overlay layer (550) and the data mix layers (560) provide information on how the individual media pieces and the dynamic multilayered media structure (370) interact with the interconnected aspects of the platform (300).

Referring to FIG. 11, each piece of original or edited media content has its own data profile. For example, an original video (531) has its own data profile (567) and it is linked to the video mix (530) and the data profile for the data mix (566) when it is used. Each dynamic multilayered media structure (370) has its own data layer (573) that also contains the data from the individual media components, including default and customized media elements that are compiled into the multilayered media file (370), including a record of the forks and branches that are created to the dynamic multilayered media structure (370) from instances when additional media elements are iterated upon the dynamic multilayered media structure (625). The data profile for the variation of dynamic multilayered media files (370) are linked in the data profile (573) and can be similar to wiki software capabilities regarding the recording of version histories, forks and branches. Additionally, each channel (220) has an additional data profile (562) that contains the data from the several dynamic multilayered media structure (370) within the channel (220) as well as the data from the individual media components. The data mix layer (560) identifies and updates the information of all pieces within the dynamic multilayered media structure (370), showing the titles, descriptions, thumbnails and other associated content for the video and audio content. The data mix layer (560) can also contain: metadata that provides information on content categories; viewing information (including play stats); user-consented analytical information; and default and alternate play instructions. The information presented by the data mix layer (560) can be generated automatically from the platform's metadata, manually generated by the content producer (320), or a combination thereof.

The data overlay layer (550) is the portion of the dynamic multilayer media structure (370) that displays small pieces of the data mix layer (560) on the main viewing device. The data overlay layer (550) can also include any visual, auditory, or app-connected information that allows a user (310) to access more information about the content they are watching, including a brand sponsorship/ad (335), channel (220), dynamic multilayered media structure (370), and individual media elements that are part of the dynamic multilayered media structure (370).

The following are examples of the data overlay layer (550): a visual scan code (QR code), which can connect the user (310) to the data mix layer (560) or any other web page, based on the content producer's (320) choices; an auditory signal sent to the phone to access data mix layer (560); a user's device automatically accessing the data mix layer (560) through other devices that are connected by a unified user account; a URL/information from the data mix layer (560) shown on the screen and the user (310) accesses the data mix layer (560) by typing this information into a web browser; and a visual scan code provided by a social media service which allows a user (310) to visit a specific social media account or web page. The data overlay layer (550) options can be created by the content producer (320) or can be automatically generated by the data mix layer (560) and the platform's metadata.

When accessing the data mix layer (560) and the data overlay layer (550), a user (310) can learn about brand sponsorships (i.e. ads) (335) that are associated with a dynamic multilayered media structure (370) or channel (220). The sponsorships can be the same for all users (310) (manually configured) or can they be decided programmatically—meaning that they are selected based on a decisioning engine/algorithm to determine the best fit for the brand sponsor (330) and the user (310) based on their expressed interests. For example, the data and preferences (170), the brand (330), the content producers (320), and users (310) influence how the decisioning engine (360) decides which ad is the best fit for a specific ad placement.

Referring to FIG. 12, brand sponsorships (ads) (335) can replace all layers of media (900) or it can be created to appear only on specific layers (905) of the dynamic multilayered media structure (370). Ad placement may be decided manually by the brand (330), decided automatically using programmatic technology (360), influenced by the content producer (320), or a combination thereof.

The sponsorship information can include elements such as a custom visual scan code (i.e. QR code) with an optional logo on the main viewing screen. The brand (330) sponsor can choose to either have the data overlay layer (550) connect to the data mix layer (560) or a different location such as a custom branded page. These pages can be displayed on responsive web sites that display differently devices such as computer, table or mobile devices, or through an application. A brand (330) sponsor (advertiser) is able to select several action opportunities that the user (310) can access. These activities generally include links or CTAs (calls to action) where the user (310) can engage with the brand (330), including opportunities to learn more, view more media, visit web pages and social sites, sign up for a newsletter list, make a purchase for physical items, events, or digital items and services. Data feeds and API from external sources can be used to update the CTAs in real time.

The user account settings and preferences allow users (310) to create a user account which allows them to generate a customized experience with the platform (300) and multilayered media channels (220). The account may be cloud-based and can be created by an individual, business, local community, data collective or organization. The setup can be done through a secured website or software application. The setup involves registering streaming devices, external user accounts (such as an external music player; connected through APIs), privacy preferences, channel content preferences, offline content access, payment settings, real-time controls, and content publishing options. When a user (310) creates an account, the user (310) may be prompted to create login information or a connection to any relevant external social accounts. In order to ensure the User's privacy, their personally identifiable information (PII) may be anonymized, leaving only relevant information to be used. The user (310) may consent or indicate that they wish to share additional information in order to allow the platform (300) to deliver customized content that is more relevant to the user's preferences.

A channel (220) is a series of dynamic multilayered media structures (370) that are combined to play together in a linear format. The channel (220) structure looks like a traditional linear TV configuration, except these are several media files that are playing simultaneously according to programmed settings. The platform (300) of the present invention provides for default and customized channels. Default channels can be set by the technology administrator (340) or the user (310), depending on advanced settings such as payment structures. When a user (310) accesses the platform (300), the first default channel (220) appears. The user (310) can watch the channel (218) or change the channel (215) by sending commands through one of their connected devices such as a touch screen on tablet (825), voice control on smart speaker (810).

A user (310) has the ability to share their preferences about the specific channels (220) or the general characteristics (data, categories, traits, moods) that the user (310) would like to see. The series of content preferences is added to the decision engine (360), where the channel preferences are combined with the preferences of the content producers (320) (based on the metadata categories of their content), and the brands (330). The overall decisioning criteria and the amount of impact that each participant in the decisioning marketplace's algorithms can be modified by the technology administrator (340). The decisioning process can be interchangeable using internal or external technology and the technology administrator (340) has the ability to show the decisioning criteria with varying degrees of transparency (i.e. be fully transparent or share part of the decisioning criteria). Channels (220) can be programmed to have a finite number, in which case the user (310) may go from the last channel back to the first channel that was programmed in advance. Alternatively, channels (220) can be set to change to non-specific channels (230) and appear based on recommendations based on the user's preference settings (170), the data shared with the platform (300), and specific requests for content. These dynamic channels (140) are created based on default settings, customized settings, or algorithmic/machine-learning-determined settings.

As mentioned above, the programmatic decisioning engine (360) is set to determine the weight and impact of specific factors, including but not limited to: user content preferences (170); brand demographic intentions within the brand data mix (960); financial payment models between brands (330) and users (310); and local community standards. The technology administrator (340) has access to change and/or import media serving algorithms that modify the decisioning criteria and outcomes. The technology administrator (340) also adds APIs that provide additional services (350) such as blockchain integrations, additional analytics, or integrations to comply with regional standards. Brands (330) can integrate their sponsored content (335) into media channels (220) and connect them with users (310) who are more likely to positively respond. Relevant ads are shown based on first party, third party, and self-reported data sources.

First party data may include but is not limited to: dynamic multilayered media structures (370) viewed; scans for more info; engagement (viewed more info, liked ad, made purchase); purchase history; likes/dislikes on the platform (300); technographic (devices used); search activity; demographic estimations; and algorithmic indications. Self-reported first party data may include but is not limited to: age;

gender; location; language; interests; preferred bands; disliked bands; and payment info. Third party data may include but is not limited to: social brands followed; social grid (activities from friends); search activity; online habits; and responders/look-a-like modelling. Technology administrators (340) can collect data on an aggregate level, such as but not limited to: number of active users (310); average number of hours used in one session; average number of hours used in a month; how often users (310) change the channel (215); average time per channel (220); ads served per hour; percent of users (310) who access the data layer (244); percent of users (310) who sign up/make purchase; how users (310) choose to pay for items seen on site; what types of items users (310) interested in buying; and average item cost per purchase/per user (310).

When a content producer (320) assembles a dynamic multilayered media structure (370), the content producer (320) may also indicate the types of ads that can be displayed. This can be based on what is deemed brand-appropriate by the producer. Users (310) can indicate their preferences for content, advertising, privacy, and data. These are controlled through user account settings (170) and influence the sponsored brand content (ads) (335) that are displayed while watching dynamic multilayered media structures (370).

The technology administrator (340) can add content filters to scan for copyright (535) and to make sure the decisioning technology/algorithms and payment systems (345) are working properly. They can also add a human filtering element to the process as part of the decisioning process (360).

A user (310) (including individuals, companies, organizations, data collectives and communities) can select their own preferred content channels (220) that appear on their channel lineup (140). Through a menu/dashboard interface within their user preferences (170) account, the user (310) indicates their ideal setup. A user (310) can: decide to change the order of the default channels (220); add entire channels (220) to their lineup; create new channels (220) from a selection of broadcasters (320); publish their own original media content (610) in the platform content library (246); and edit, compile and curate a dynamic multilayered media structure (630) as a content producer (320) and add it to the programmatic decision engine (360), where the files can be shared with others or kept as private channels (220).

After the user (310) indicates their ideal combination of channels (220), this input is added to the decision engine (360), where several considerations regarding payment models (subscription based vs. ad supported) and AI-determined recommendations may be added. A user (310) can have part of their requests considered or all of their requests influence the final channel lineup, depending on the criteria that the technology administrator (340) has selected. If a user (310) strongly prefers to not have AI-recommended content or ads they can indicate this also. Standards and policies determined by regional governments, organizations, or communities may also influence how the publishing and decisioning process is implemented.

Referring to FIG. 10, it is important to note that this platform (300) uses original and iterative (created from multiple original sources) content. As such, the correct original content creators and content producers may be separated for compensation purposes. Copyright filters (535) can be added by the technology administrator (340), and humans can be paid to add additional monitoring. If the original pieces of media used to produce a dynamic multilayered media structure (370) violate copyright standards, they can automatically be swapped out with alternative or default pieces of content (536). The original media creator (600) and the content producer (320) can be notified. Smart (blockchain supported) and regular contracts can be implemented to solve these issues without wasting time. Users (310) and AI filters have the ability to flag content and help to identify the original source content creator (320) or the individuals/entities who have a potential dispute. If a specific media piece within a dynamic multilayered media structure (370) is flagged, it can be programmatically swapped out with a new piece of content, which can be pre-programmed by the content producer (536) or by the tech administrator (537).

It should be understood, of course, that the foregoing relates to exemplary embodiments of the invention and that modifications may be made without departing from the spirit and scope of the invention as set forth in the following claims.

The invention claimed is:

1. A computer-implemented system for provisioning media elements, comprising:
   a data mix configured to store, associate, or modify a plurality of media elements, wherein each media element includes metadata that may define default or alternative play configurations;
   a decisioning engine that determines media selection and playback based on at least one of:
   AI-driven or algorithmic decisioning;
   stakeholder-defined inputs;
   predefined rules;
   programmatic logic; or
   external system inputs; and
   playback system that executes media elements, including original, modified, compiled versions, or aggregated versions according to the data mix;
   wherein a stakeholder comprises at least one of:
   an end-user, content producer, technology administrator, brand sponsor, licensing entity, compliance engine, regulatory authority, or autonomous agent.

2. A computer-implemented system for media playback, comprising:
   a dynamic multilayered media structure organized into channels, each channel comprising a plurality of independently modifiable layers,
   wherein the plurality of independently modifiable layers comprise audiovisual elements and include metadata, metadata-based overlays, or supplementary content, and wherein said channels alternatively may be represented as tracks, feeds, playlists, or playback groupings;
   a media control system enabling users to:
   modify, swap, persist, enable, or disable media layers during channel transitions;
   execute channel changes or track-level transitions that dynamically restructure the arrangement, sequence, or visibility of media layers based on system rules, stakeholder-defined inputs, programmatic logic, or algorithmic decisioning; and
   distribute media layers across single devices, multi-device environments, or distributed computing systems; and
   a decisioning engine that determines playback behavior based on at least one of:
   AI-driven, programmatic, or algorithmic decisioning;
   stakeholder-defined inputs;
   predefined system rules; or external inputs including engagement data, contextual metadata, or environmental conditions.

3. The computer-implemented system according to claim 2 comprising a computer-implemented application for interacting with a plurality of media layers coordinated by a data mix, comprising:

a user interface configured to enable customization of playback settings, including at least one of:
enabling or disabling specific media layers;
transitioning between media layers based on system rules;
modifying playback configurations; or
selecting playback modes; and
a metadata-driven framework that dynamically adjusts media elements in response to at least one of:
AI-driven, programmatic, or algorithmic decisioning;
real-time system conditions;
stakeholder-defined preferences; or
contextual metadata inputs or external environmental parameters.

4. A computer-implemented method for provisioning a plurality of media elements, the method comprising:

receiving at least two of:
stakeholder inputs;
AI-driven, programmatic, or algorithmic decisioning;
external system data;
pre-configured playback settings;
engagement analytics;
contextual metadata; or
hardware or sensor triggers;
structuring media elements into dynamically modifiable layers based on a metadata-governed framework;
executing playback based on a data mix, wherein playback includes at least one of:
maintaining an existing configuration,
reconfiguring media associations,
adjusting playback sequencing, or
substituting media elements dynamically; and
distributing and synchronizing the media elements across at least one of:
a single computing device;
multiple interconnected devices; or
a distributed computing environment;
wherein the plurality of media elements may be dynamically merged, transformed, or restructured into a composite layer or maintained as separate layers during playback.

5. The computer-implemented system of claim 1 wherein the media elements are structured into media layers, compiled into dynamic multilayered media structures, and further organized into channels and dynamic channel lineups based on at least one of:

executing real-time commands, adjusting playback settings, or responding to observed or declared stakeholder preferences issued by at least one of: an AI content producer, technology administrator, decisioning engine, compliance engine, human content producer, brand sponsor, or end-user;
enforcing provisioning directives based on payments, subscriptions, financial transactions, contracted agreements, or licensing terms defined by stakeholders including brands, content producers, or governance entities;
applying automated curation and structuring logic, including AI-driven, programmatic, or algorithmic methods, weighted governance models, or metadata-based frameworks to dynamically arrange media layers;

executing content provisioning using machine learning, rule-based systems, or adaptive refinement techniques to optimize media configurations; and
integrating external systems, including third-party licensing platforms, compliance verification services, or programmatic content distribution networks to manage structured media elements.

6. The computer-implemented system of claim 1, wherein the provisioning of media elements includes dynamically modifying media elements during playback based on marketplace-influenced parameters, including at least one of:

dynamic content curation of stakeholder preferences, brand-sponsored content, or financial models;
resource exchange mechanisms including direct payments, subscriptions, sponsored content, or tokenized licensing transactions;
programmatic, algorithmic, or AI-driven decisioning for media selection based on weighted governance models;
payment structures involving content producers, original media element creators, and licensing entities;
brand sponsorship and custom messages integrated within specific layers or across the dynamic multilayered media structure; or
blockchain-based or API-driven monetization frameworks for managing licensing, transactions, and resource exchanges; and
measurement of original, modified, or fractionalized media elements, including compilations or pluralities of media segments, based on past performance, predictive interaction data, or stakeholder engagement signals.

7. The computer-implemented system of claim 1, wherein the playback system is executed by selecting, synchronizing, or adapting media elements either dynamically in real time or based on pre-defined scheduling, configuration settings, or programmatic logic, across at least one of:

a single device;
multiple synchronized devices;
a 3D immersive environment; or
a distributed computing environment,
wherein media elements are dynamically merged, transformed, restructured into a composite layer, split into temporally aligned tracks, distributed as discrete components across multiple synchronized devices, or maintained as separate layers during playback across said environments.

8. The computer-implemented system of claim 1, wherein the data mix maintains real-time state tracking for media elements and dynamically modifies playback configurations based on at least one of:

playback instructions;
media association mappings;
attribution data;
interaction histories;
user-intention signals comprising at least one of: button presses, voice commands, movement-based gestures, biometric responses, brain-computer interface inputs, typed expressions, system-observed behaviors, inferred goals, emotional indicators, or real-time control interactions;
context-sensitive metadata, including at least one of: geographic identifiers, demographic parameters, licensing metadata, intellectual property attributes, or engagement analytics;
system-driven playback modifications; or
adaptive content structuring.

9. The computer-implemented system of claim 1, wherein a 3D immersive environment comprises at least one of:

virtual reality (VR) headsets or environments;

augmented reality (AR) displays or devices;

mixed reality (MR) interfaces;

spatial computing systems;

3D environments accessible through 2D screens, multi-device configurations creating immersive spaces;

user-navigable virtual spaces where media is presented contextually;

environments where media layers adapt based on user movement or position; or interconnected IoT devices arranged to create spatial media experiences.

10. The computer-implemented method of claim 4, wherein a distributed computing environment includes at least one of:

cloud-based systems;

edge computing networks;

blockchain-based distributed systems;

third-party API-integrated services;

decentralized storage networks;

compute-sharing networks configured for real-time content synchronization and ai-driven, programmatic, or algorithmic decisioning; or Internet of Things (IoT)-connected devices.

11. The computer-implemented system of claim 2, wherein the media layers are distributed, modified, or interacted with playback devices, including at least one of:

a smart TV;

an Internet-of-Things (IoT) device;

a personal computer or laptop;

a smartphone;

a tablet;

a virtual reality (VR) headset, augmented reality (AR) device, or a 3D environment, a multimedia gaming and entertainment console or set-top box;

a smartwatch;

an Over-The-Top (OTT) streaming device;

a smart display or embedded control surface;

a distributed computing node;

a cloud-connected media environment;

any computing device capable of executing playback, interaction, or synchronization within a dynamic multilayered media structure.

12. The computer-implemented application of claim 3, wherein the data mix provides media layers and playback options using at least one of:

graphical user interfaces or screen-based visualizations for selecting, modifying, or arranging media layers;

timeline-based or spatial controls that depict media sequencing, synchronization, or playback adjustments;

overlay-based interaction elements, including layer selection menus, interactive previews, or metadata displays;

adaptive multimodal feedback mechanisms, including sensory feedback mechanisms, auditory signals, or visual responses based on user interactions, accessibility settings, or device-specific formats; or gesture-based or motion-tracking inputs, or other interface-recognized user actions, translating interactions into real-time modifications of media attributes or playback settings.

13. The computer-implemented system of claim 1, wherein user-defined modifications are stored within the data mix, a user account, an external preference database, or a governance-linked configuration profile for persistent playback customization across sessions.

14. The computer-implemented system of claim 2, further comprising a control interface configured to provide transparency into AI-driven, programmatic, or algorithmic systems, compliance visibility, and user-adjustable content personalization, wherein the control interface:

displays algorithmic weighting factors, content ranking parameters, compliance constraints, and monetization criteria influencing media selection and playback;

enables users to override, modify, or adjust recommendation models by altering preference weighting, filtering mechanisms, ranking logic, or governance rules in real time; and provides structured access to governance interventions, compliance validation records, and decisioning logs based on role-based permissions, regional governance models, collective governance preferences, or community-defined standards.

15. The computer-implemented method of claim 4, comprising a collaborative media curation interface enabling at least one of:

multi-user contribution to media layer selection, organization, or remixing;

real-time input from stakeholders for content inclusion, exclusion, or weighting;

version control, iterative forking, and conflict resolution for concurrently edited media tracks;

attribution of individual edits, comments, or approvals within shared content compositions; or layer-specific access permissions for contributors based on governance roles.

16. The computer-implemented system of claim 2, wherein the data mix provisions media elements from at least one of:

the platform content library containing original media elements;

locally saved files accessed directly from computing devices;

external media sources connected through API integrations;

digital physical media including optical discs, flash drives, memory cards, or external storage devices;

analog physical media including vinyl records, magnetic tapes, or other non-digital formats;

real-time inputs captured through audio, visual, or sensor devices, wherein captured content is recognized, matched, or identified and structured into the data mix for playback, remixing, or licensing validation;

media elements edited into condensed form by content producers;

original media elements from licensed companies or original media creators;

media elements generated by AI systems, autonomous agents, or automated remix engines;

media elements sourced through governed marketplaces, tokenized licensing platforms, or structured content exchanges;

valid sources online accessed through search and selection methods; or user-aggregated content structured into the data mix.

17. The computer-implemented system of claim 1, wherein playback modifications are dynamically adjust based on at least one of:

real-time or pre-configured scheduling, configuration settings, or programmatic logic, including engagement analytics processed by the decisioning engine to modify media sequencing and layer configurations;

external system data influencing playback behavior through metadata-driven processing, including at least one of:

compliance updates;

licensing adjustments;

marketplace-based content structuring; or contextual metadata tags;

regulatory compliance enforcement modifying playback based on at least one of:

copyright policies;

geographic content restrictions; or content moderation rules;

AI-driven, programmatic, or algorithmic content curation optimizing playback sequences and personalizing media structures based on historical, contextual, or system-defined metadata;

monetization-based adjustments modifying media configurations based on:

dynamic brand integrations or custom sponsorship content;

revenue-sharing logic tied to stakeholder engagement or licensing frameworks;

microtransaction-based content access models; or personalized promotions or sponsorship alignments using AI-driven, programmatic, or algorithmic decisioning systems;

network bandwidth and latency conditions influencing playback synchronization and quality;

device-specific performance factors, including processing power, available memory, or input/output constraints;

power efficiency considerations including battery level monitoring or adaptive playback modes;

media quality optimization routines, including adaptive bitrate control, dynamic volume leveling, brightness or transparency adaptation, or other playback fidelity mechanisms;

wherein these adjustments are implemented across at least one of:

a single computing device;

multiple interconnected devices; or a distributed computing environment.

18. The computer-implemented method of claim 4, wherein the data mix governs media element organization and playback within a dynamic multilayered media structure by:

defining structural relationships between media layers through metadata associations or tag-based dependencies;

dynamically modifying layer configurations based on AI-driven, programmatic, or algorithmic decisioning, stakeholder inputs, or marketplace criteria;

tracking playback modifications, version history, and content variations; or synchronizing playback across single devices, multi-device environments, or distributed computing networks.

19. The system computer-implemented of claim 1, wherein the data mix provisions media elements based on inputs, configurations, or provisioning actions from at least one of:

the AI Content Producer, Technology Administrator, Decisioning Engine, or Compliance Engine;

human content producers, brands, or user-driven curation processes;

AI-driven, programmatic, or algorithmic curation, weighted governance models, or metadata-based structuring protocols;

autonomous provisioning agents executing machine learning models, adaptive content refinement, or algorithmic decisioning logic; or external system integrations, including third-party licensing platforms, compliance verification services, or programmatic content distribution networks.

20. The computer-implemented system of claim 2, wherein the media control system is further configured to provide a user interface for dynamic media layer management, enabling at least one of:

swapping, enabling, disabling, or modifying audiovisual and metadata overlays in real time or according to preconfigured scheduling, stakeholder-defined rules, or programmatic logic;

adjusting playback sequencing and transition logic within channels based on user interactions, system rules, or external inputs;

triggering interactive engagement actions that modify media presentation based on predefined engagement conditions or user responses;

wherein the system further comprises a metadata-driven playback engine configured to:

dynamically modify media layers based on at least one of:

user inputs;

system-defined governance models;

contextual metadata;

external decisioning engines; or programmatic or algorithmic logic derived from stakeholder-defined parameters; and structure playback behavior based on hierarchical rules, weighted decision models, or real-time event-driven triggers.

* * * * *